US006779196B1

(12) United States Patent
Igbinadolor

(10) Patent No.: US 6,779,196 B1
(45) Date of Patent: Aug. 17, 2004

(54) INTEGRATED CAR DUBBING SYSTEM

(76) Inventor: Phillip Igbinadolor, 240-27 Caney Rd., Rosedale, NY (US) 11422

( * ) Notice: Subject to any disclaimer, the term of this patent is extended or adjusted under 35 U.S.C. 154(b) by 0 days.

(21) Appl. No.: 09/135,504

(22) Filed: Jun. 22, 1998

(51) Int. Cl.[7] .................................................. H04N 7/20
(52) U.S. Cl. .............................. 725/75; 725/74; 725/76; 725/80; 455/344; 455/345
(58) Field of Search ......................... 345/327; 386/118, 386/52; 455/12.1, 66, 344, 351, 345, 2, 3.2, 74, 90; 348/8; 725/74, 75, 76, 80, 85

(56) References Cited

U.S. PATENT DOCUMENTS

| | | | |
|---|---|---|---|
| 4,397,531 A | * 8/1983 | Lees ........................... 351/210 |
| 4,424,538 A | * 1/1984 | Greene ......................... 360/68 |
| 4,435,845 A | * 3/1984 | Timm et al. ................. 455/228 |
| 4,602,297 A | * 7/1986 | Reese ........................... 386/52 |
| 4,713,801 A | * 12/1987 | Hale .............................. 369/7 |
| 5,263,199 A | * 11/1993 | Barnes ....................... 455/344 |
| 5,732,059 A | * 3/1998 | Katsuyama et al. .......... 369/84 |
| 5,797,088 A | * 8/1998 | Stamegna .................... 455/345 |
| 5,923,624 A | * 7/1999 | Groeger et al. ................ 369/7 |
| 6,002,558 A | * 12/1999 | Rines et al. ................. 360/137 |
| 6,067,278 A | * 5/2000 | Owens et al. .................. 369/7 |
| 6,131,042 A | * 10/2000 | Lee et al. .................... 455/556 |

* cited by examiner

Primary Examiner—John Miller
Assistant Examiner—Nathan A Sloan

(57) ABSTRACT

The present invention is a vehicular wireless audio/video record/playback unit, wherein the unit detects satellite, AM/FM radio and television broadcasts including new music release and live music and entertainment events and upon detection of a commercial break, station break, distortion or satellite interruptions, the unit pauses a recording function until the commercial or station break, distortion or satellite interruptions are eliminated. The unit supports internet access, on-line banking, stock market trading, commodity and precious stone/metal trading. When integrated into the vehicular audio system and led screen the microphone and infra red night vision camera provide for telephone/video conferencing, recording of impacts and unwarranted intruder with audible sound that alerts the motorist when the camera senses fatigue, and a retractable assembly mechanism that uses the vehicular ignition switch to retrieve, retract and/or bypass the unit in the vehicular electronic compartment, wherein the unit have a record/playback memory space, high speed dubbing/memory erase and sensor configuration with the remote control peripheral for accessing the unit at any convenient seat position and a dual purpose audio/video track disk having software downloaded as the unit for rebooting the cd player or re-configure the unit if there was a unit failure.

3 Claims, 24 Drawing Sheets

LOGIC MEMORY SPACES— INTERNAL CONFIGURATION AND LOGIC FLOW

DESCRIPTIVE DRAWING OF THE MANUFACTURING PROCESSES

FIG. 22 INTERNET-FAX FUNCTIONS

INTEGRATED CAR DUBBING SYSTEM

FIELD OF THE INVENTION

This invention relates to vehicular wireless dubbing unit and more specifically a unitary reverse logic dubbing tape and CD player for recording and playback of audio/video data from satellite, AM/FM radio stations and television broadcasts.

BACKGROUND OF INVENTION

Current recording device requires considerable time and effort to perform recordings in a vehicle. It requires the vehicle operator to constantly change tape/CD and monitor recording activities. This causes driving distractions. In addition, poor quality tape or CD and bad dubbing experience are often problems of current device. It is necessary for the vehicle operator to have both hands on the steering wheel rather than trying to stop, edit, rewind, forward or eject tape/CD during recordings. Current inventions related to this field do not provide choice in those inventions wherein this device provides four choices. Current device do not provide nor have a LCD auto screen, computer motherboard with optional input ports, memory space, sensor/detector, infra camera, full function fax, internet access support function keys, telephone/video conferencing, stored power cell, impact resistant and retractable assembly component with a manual LCD cover screen against vandalism and theft. Furthermore, current device do not record from satellite, can not instantly record new music release, live music and entertainment events without commercial or station break, distortion or satellite interruptions. In addition, current device records only from radio stations onto tape/CD and often with two or more devices attached or connected to the recorder. Because of these difficulties and limitations, there exists a need for a wireless impact resistant vehicular dubbing device comprising features and functions listed above.

OBJECTS OF THE INVENTION

In view of these deficiencies of the prior art, it is one object of the invention to provide four programmable models of the unit in form of a satellite/wireless model, computer software programmable model, commercial and distortion free model and a high speed memory erase dubbing model for vehicles wherein the unit permits for recording and playback from audio/video data, satellite, radio and television broadcasts.

An additional object of the invention is to provide a record/playback memory space for storing playback or recorded data without tape or CD. This allows the vehicle operator to have both hands on steering wheel and concentrate on driving and not recording.

Yet another object of the invention is to provide a device that records from stations onto tape or CD, tape to tape, CD to CD, CD to tape, tape to CD, and tape or CD to memory without having to attach a playback device and or change tape/CD in countless manner that often result in poor quality tape or CD and bad dubbing experience.

Another object of the invention is to provide a recording device with microphone and camera wherein the unit captures impacts and unwarranted intruder within the vehicles perspective view, an audible sound that alerts vehicle operator when the camera senses fatigue, a LCD auto/manual screen for interactive games, activities and telephone/video conferencing with similar devices at a distance location.

In addition, the object is to provide a recording device wherein the unit supports Internet access, on-line banking, stock market trading on the NYSE, and other exchanges, including commodity and precious stone/metal trading in the comfort, privacy, and convenience of a vehicle. Further, the object is to provide a wireless recording device with still pictures for use with the Internet.

An additional object of the invention is to provide a sensor remote control apparatus for controlling the unit at any convenient seat position of an angle 180–360 degree in a vehicle, wherein the unit CD player of the invention provides a dual purpose audio/video track disk for use with the CD player having a software program downloaded as the unit to reboot the CD player or re-configure the unit if there was a unit failure. Also provided within the unit is a stored power cell by means of microprocessor contained in the computer motherboard that permits the unit to endlessly scan through its database of stored list of recording companies, artists, radio, television, satellite, billboards and recording studios even when the system is turned off and wherein the-unit identifies and record a first time new music release in category of the recording companies, i.e. country music, R B music and to retain data files or previous mode of a record/playback state.

These and other more detailed and specific objects of the present invention will be better understood by reference to the following figures and detailed description which illustrate by way of example but a few of the various forms of the invention within the scope of the appended claims.

SUMMARY OF THE INVENTION

In view of the above-described problem, an object of the present invention is to provide a simultaneous dubbing operation from stations, tape or CD player and memory space.

The present invention relates to an audio/video record/playback of a tape or CD player for recording from stations onto tape or CD, tape to tape, CD to CD, CD to tape, tape to CD, and tape or CD to memory. Further, the invention relates to an audio/video surround sound microphone and night vision camera (hereinafter referred to as infra camera) that provide means of telephone/video conferencing, recording of impacts and unwarranted intruder, an audible sound by means of speakers and microphone that alerts a motorist when the camera senses fatigue in the motorist.

Even more particularly, the present invention relates to a reverse logic audio/video dubbing CPU that integrates a microphone, a vehicular speaker system, a LCD screen, a computer motherboard with optional ports, Internet access, a record/playback memory space, high-speed dubbing and memory erase capabilities, a digital/analog clock, a full function fax and print delivery tray (hereinafter referred to as components).

More specifically, the present invention makes use of AM/FM radio stations, television broadcasts and a satellite antenna that detects new music release, live music and entertainment awards, sports events, children television special (hereinafter referred to as embodiment/frequency signals) and upon detection of a conmmercial break, station break, distortion or satellite interruption, the unit pauses a recording function until the commercial or station break, distortion or satellite interruptions are eliminated.

Specifically, the present invention makes use of a technical ground personnel, satellite dishes (hereinafter referred to as programmed satellite/wireless sources), a satellite antenna (hereinafter referred to as power antenna) having multi directional receptacles for detecting and scanning the unit programmed embodiments, i.e. new music release, live music/entertainment events, sports and children television specials and an optional port having accessory and/or auxiliary port (hereinafter referred to as port) for connecting other accessory device (hereinafter referred to as accessory) i.e. games, navigator by preferred means of a serial or parallel cable. In a preferred form of the invention, the vehicle operator and other passengers could engage a preferred audio or video record/playback selection by means of function keys provided (hereinafter referred to as parts) embodied on the face of the unit.

More specifically, the device of the present invention downloads software programming from satellite/wireless sources, i.e. satellite dish. In addition, the present invention uses a dual-purpose audio/video track disk having software downloaded as the unit to reboot the CD player or re-configure the unit if there was a unit failure and to store data files. Further, the device of the present invention comprises a sensor configuration with the unit remote control (hereinafter referred to as peripheral) used by a vehicle operator and passengers to access functions of the dubbing unit at any convenient seat position. A general objective of the invention is to provide an impact resistant dubbing device that uses the vehicle ignition switch to control the unit retractable assembly.

These objects, features and advantages of the present invention will become more apparent in light of the following detailed description of the best mode embodiments thereof as illustrated in the accompanying drawings and figures.

BRIEF DESCRIPTION OF DRAWINGS AND FIGURES

DETAILED DISCRIPTION OF THE PREFERRED EMBODIMENT

Figure 8:
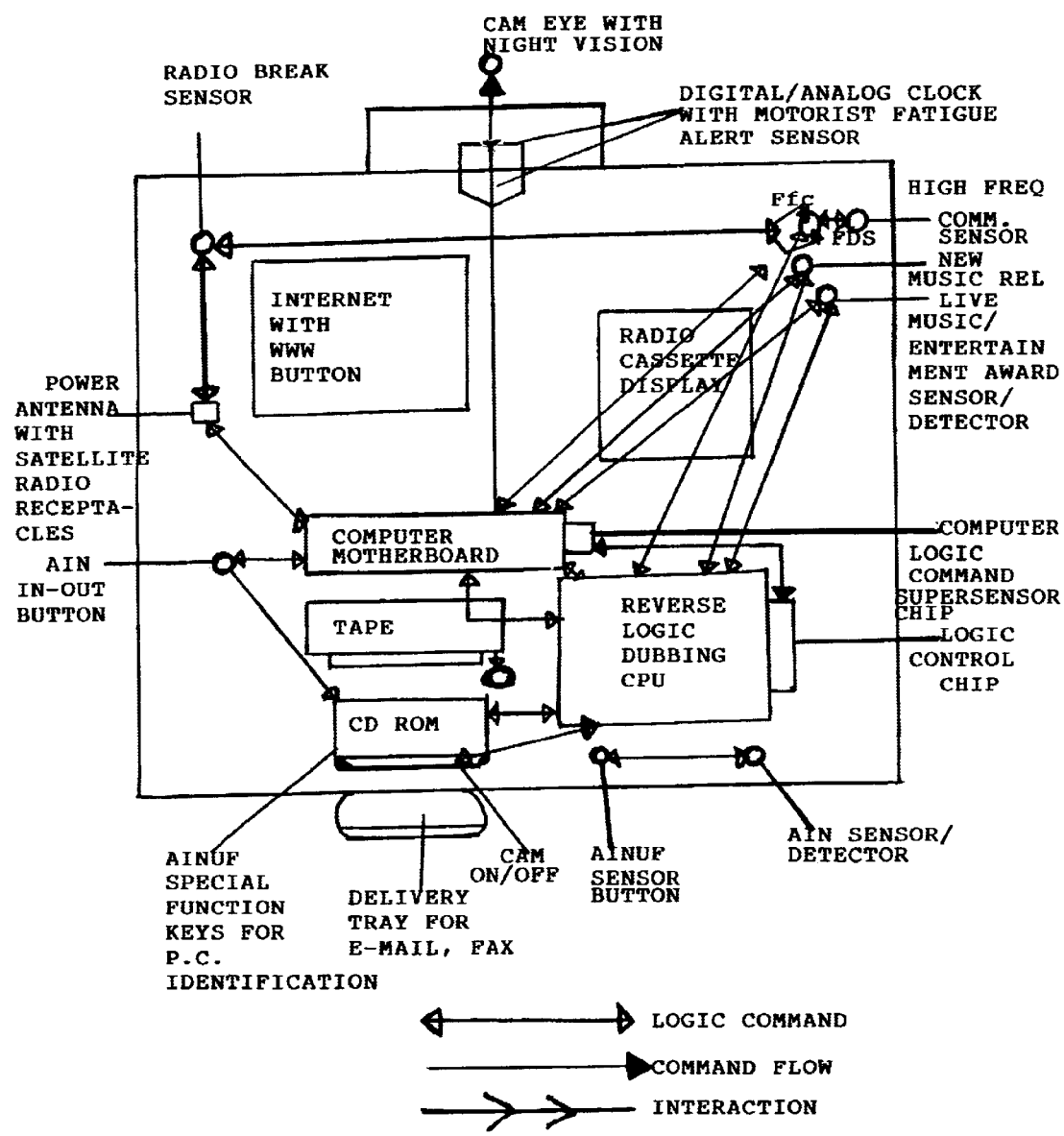
FIG. 8 is a block diagram showing a schematic view of the internal configuration and connections of the integrated car dubbing system of the present invention.
Figure 9:
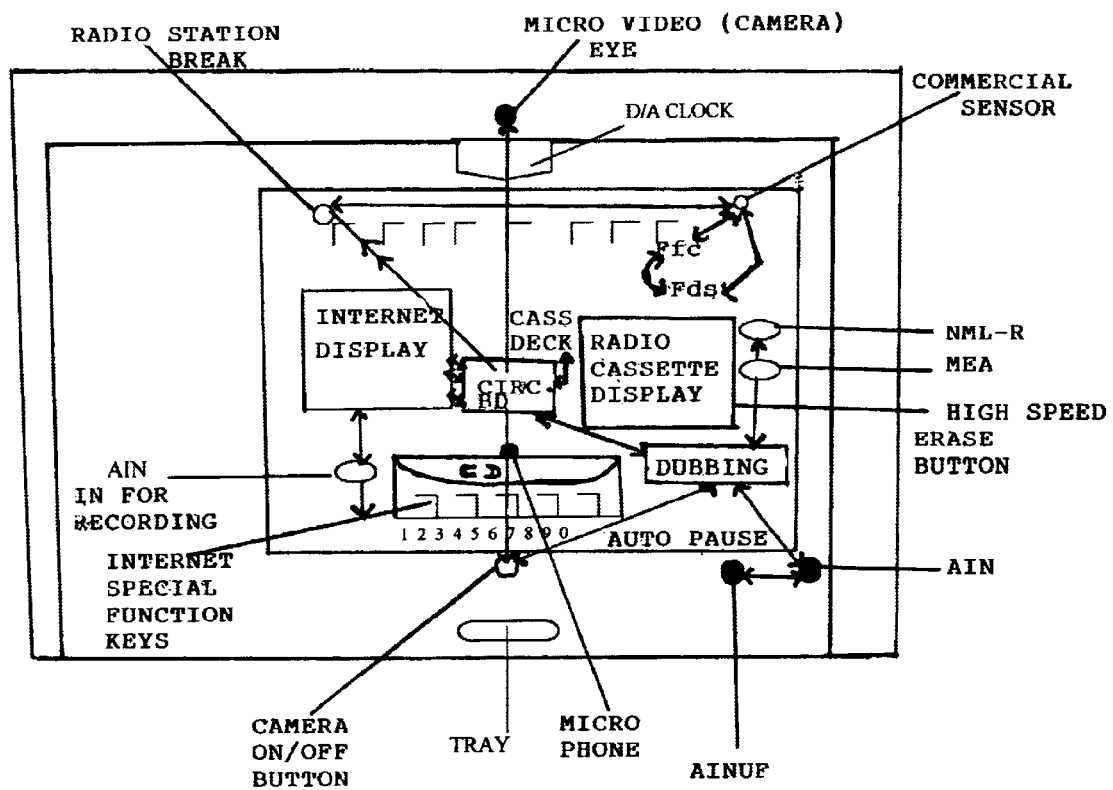
FIG. 9 is a schematic view showing the relation of components and parts of the integrated car dubbing system of the present invention.
Figure 10:
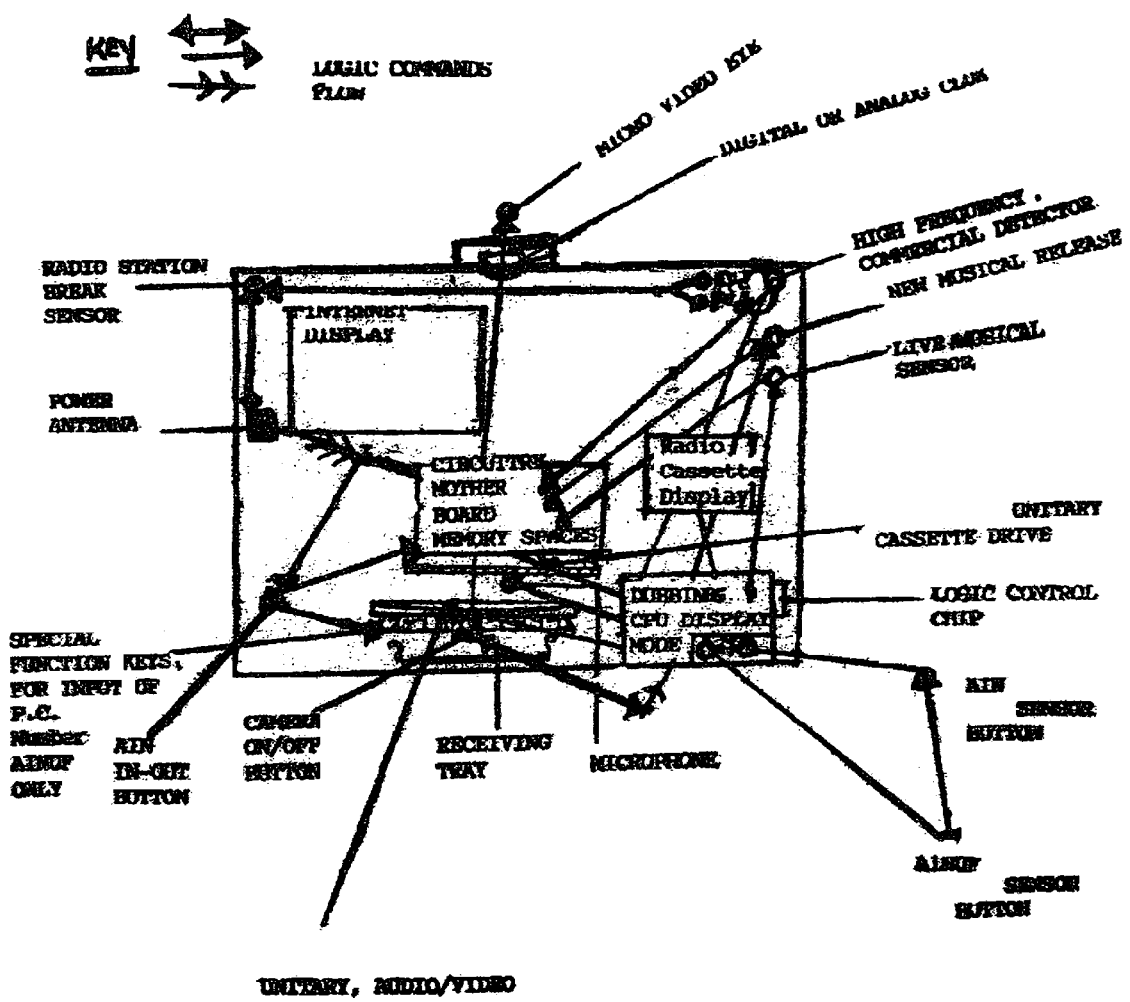
FIG. 10 is a schematic view showing the relation of computer motherboard and memory circuitry of the integrated car dubbing system of the present invention.
Figure 12:
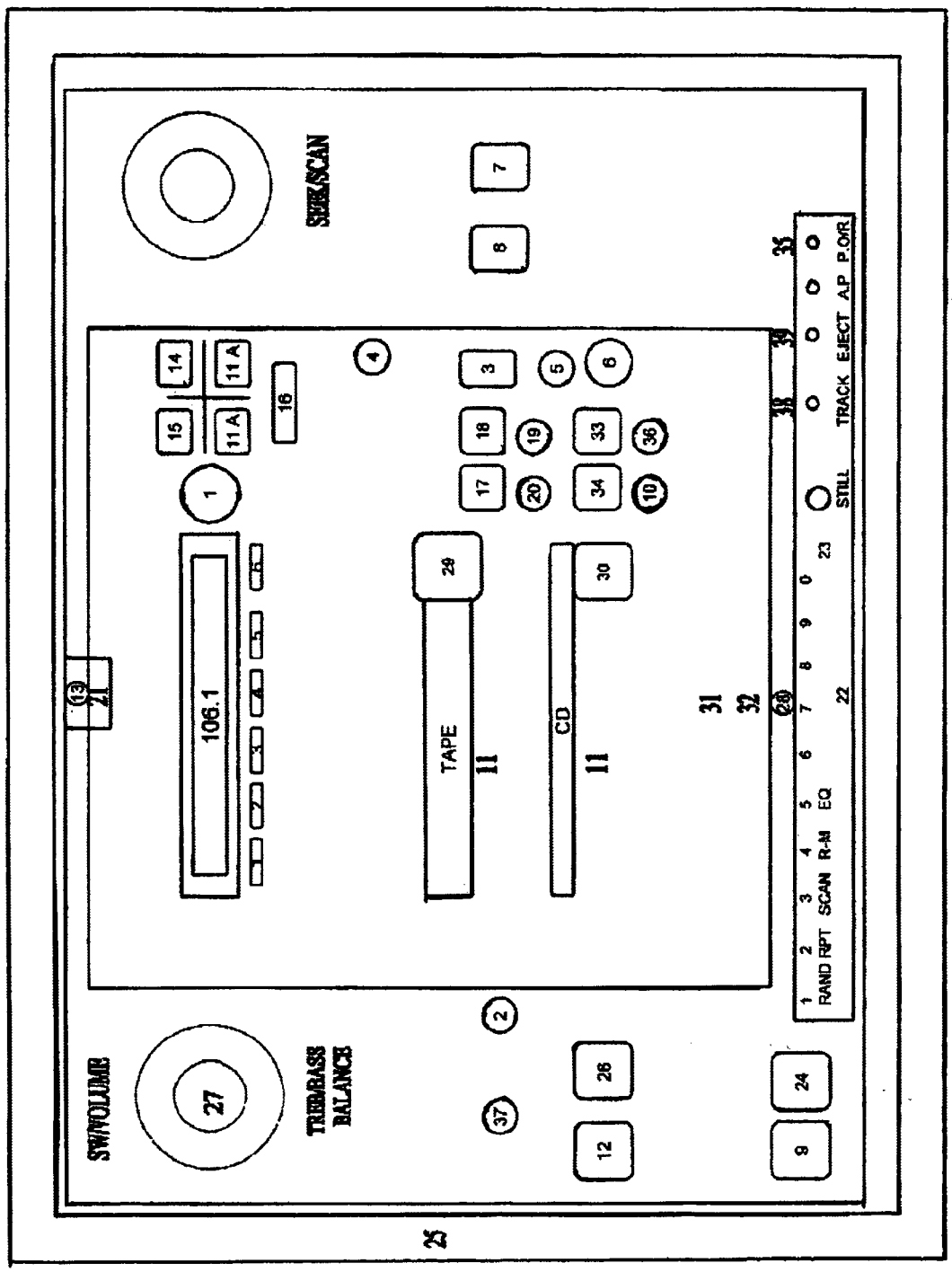
FIG. 12 is an overall diagram similar to FIG. 1 wherein the same numerals of FIG. 12 correspond to parts in the several views of FIG. 1 for explaining designated keys location of parts and components of the integrated car dubbing system of the present invention.

Refer now to FIG. 12 wherein the same numerals refer to corresponding parts in the several views of FIG. 1 of the present invention will be described. Also, refer to FIG. 8 wherein the same refer to FIG. 1 for showing the unit internal configuration, integration and connections according to the present invention.

Figure 1:
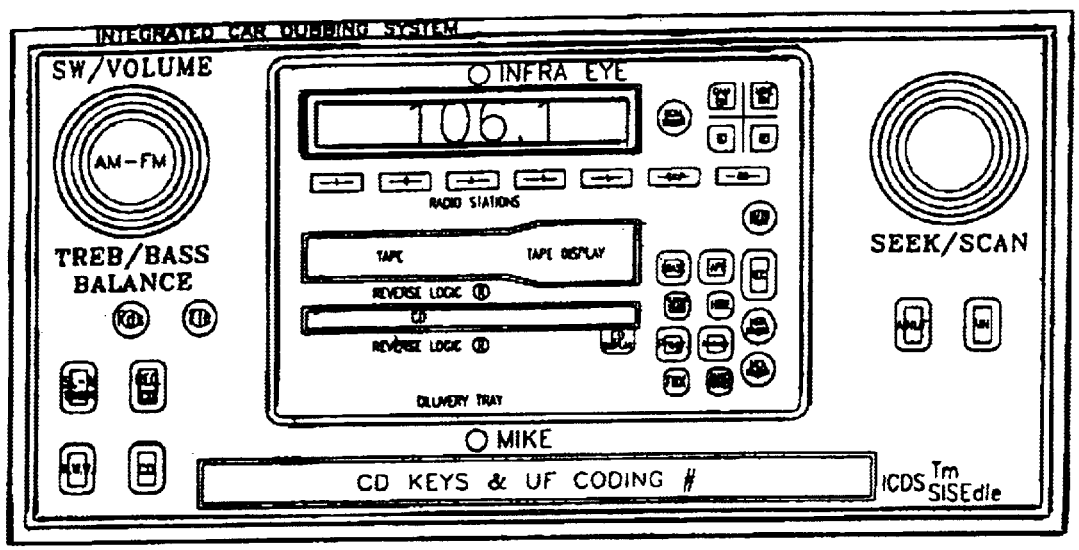
FIG. 1 is a front elevational view of the integrated car dubbing system of the present invention.
Figure 2:
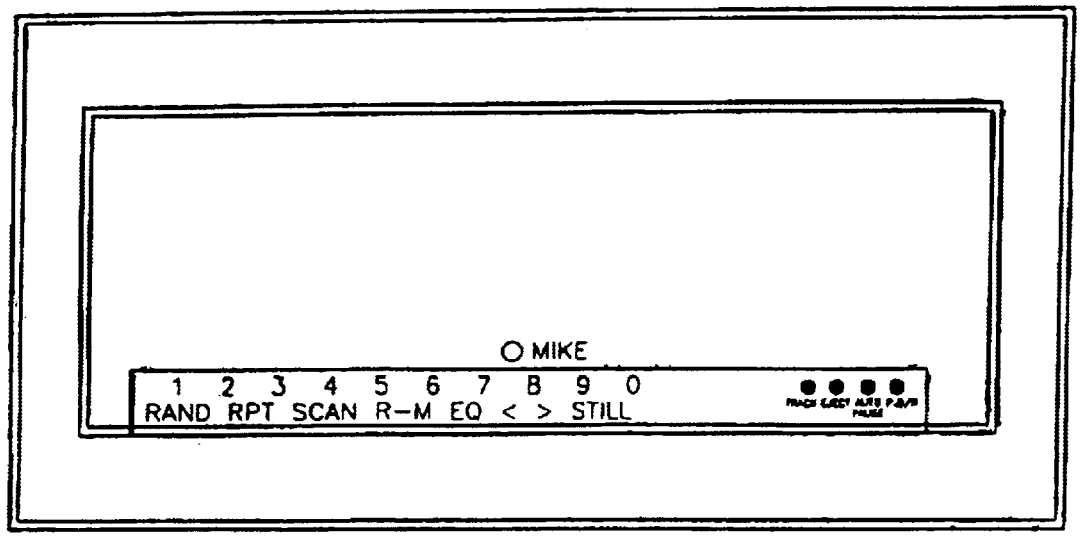
FIG. 2 is a bottom view of the cd player function keys and the uf coding # panel for personalizing internet access according to the present invention.
Figure 3:
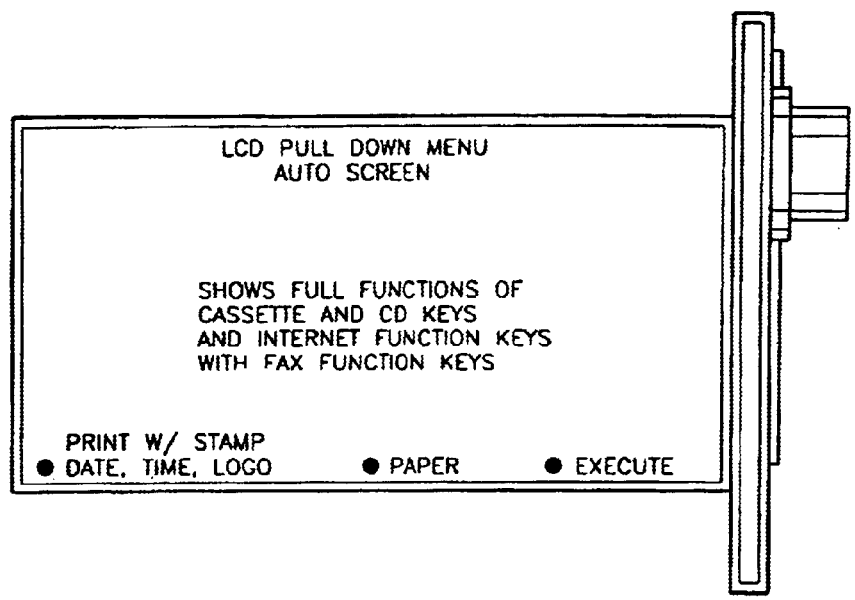
FIG. 3 is a front elevational view of a lcd auto screen of the present invention.
Figure 4:
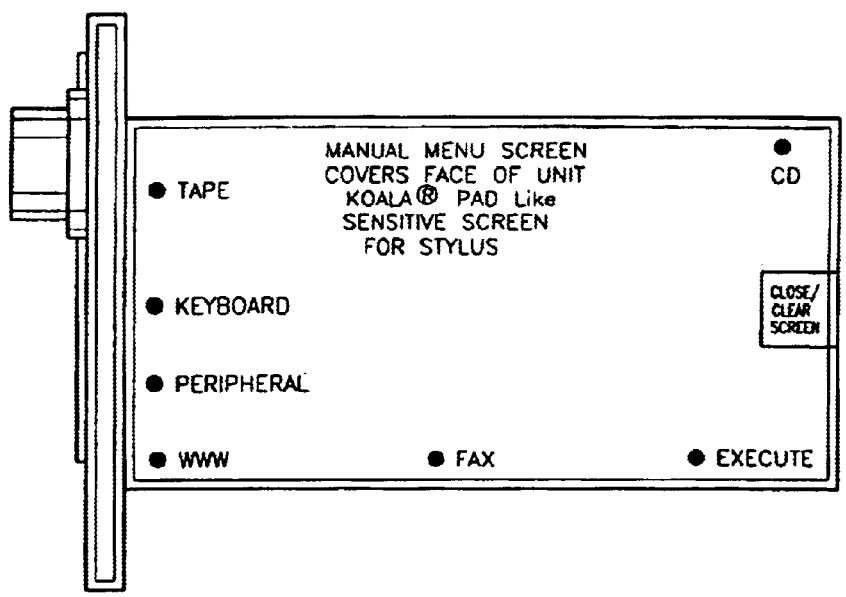
FIG. 4 is a front plan cover view of a lcd manual screen of the present invention.
Figure 5:
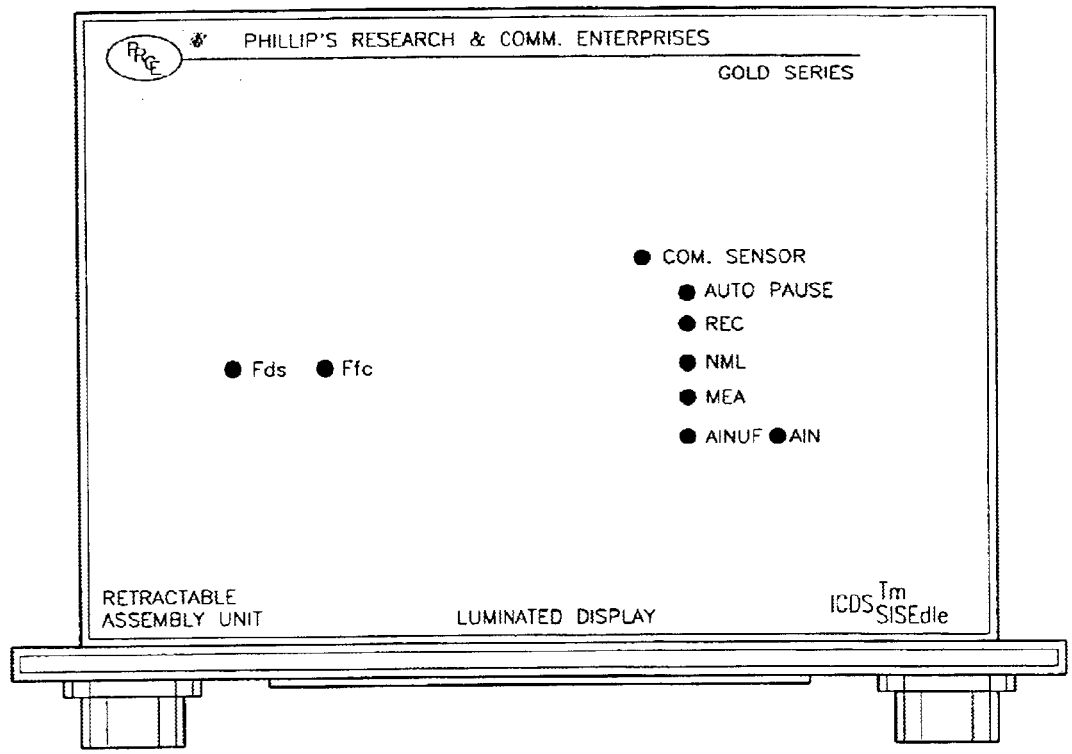
FIG. 5 is a top plan view of the present invention.
Figure 6:
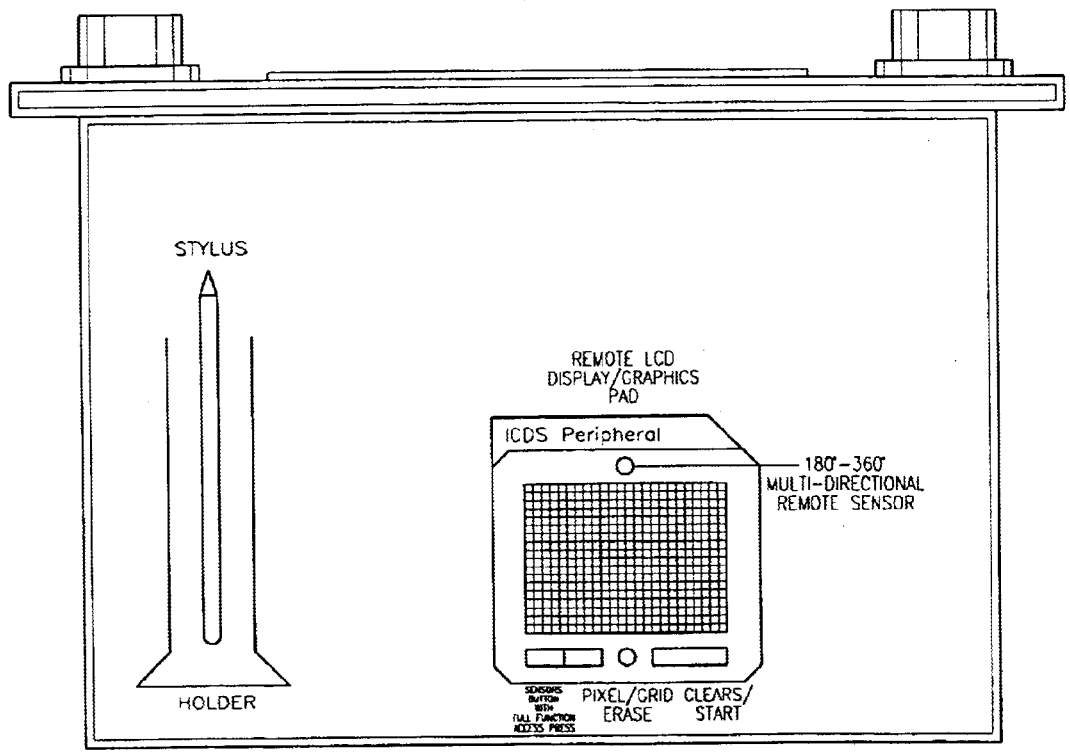
FIG. 6 is a front plan view of the unit remote control showing stylus/holder according to the present invention.
Figure 7:
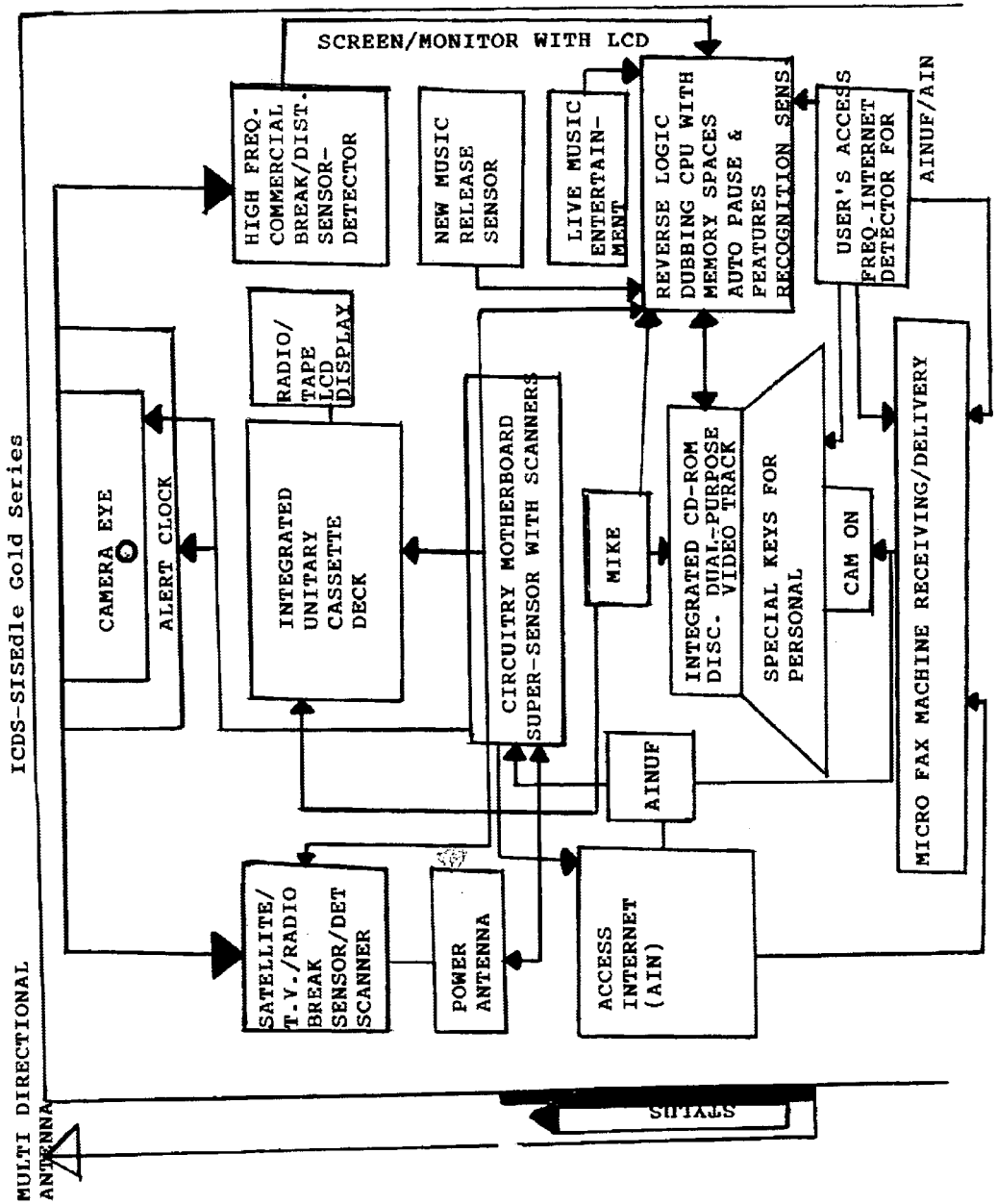
FIG. 7 is a block diagram showing the relation of components of the integrated car dubbing system according to the present invention.

FIG. 1 shows an example of an audio/video unit according to the present invention. In FIG. 12 corresponding to FIG. 1, reference numeral 1 is the unit commercial, station break, distortion and interruption free sensor herein referred to as COM.SENSOR. Reference numeral 2 is a high frequency commercial/distortion sensor herein referred to as Ffc. Reference numeral 3 is a cassette tape playback/memory record function key herein referred to as REC. Reference numeral 4 is a cassette tape record/playback auto pause function key herein referred to as AP. Reference numeral 5 is a cassette tape/CD record/playback new music release sensor key herein referred to as NML-R.

Reference numeral 6 is a cassette tape/CD record/playback live music and entertainment event sensor key herein referred to as MEA. Reference numeral 7 is a CD record/playback internet access sensor key herein referred to as AIN. Reference numeral 8 is a CD record/playback internet access users frequency function key herein referred to as AINUF. Reference numeral 9 is a world-wide- web sensor key herein referred to as WWW. Reference numeral 10 is a full function fax machine beneath the fax delivery tray. Reference numeral 11 is a cassette tape/CD record/playback reverse logic dubbing CPU indication flap. Reference numeral 11 A is a cassette tape/CD record/playback audio-video on/off switch key. Reference numeral 12 is a CD record/playback satellite/wireless software programmed sensor key herein referred to as SL-W. Reference numeral 13 is a CD record/playback night vision camera eye herein referred to as CAM.EYE. Reference numeral 14 is a cassette tape/CD record/playback microphone on/off switch key. Reference numeral 15 is a CD record/playback camera on/off switch key. Reference numeral 16 is a cassette tape record/playback skip function key. Reference numeral 17 is a cassette tape record/playback/memory erase function key. Reference numeral 18 is a cassette tape unitary record/playback deck herein referred to as TAPE. Reference numeral 19 is a cassette tape record/playback tune function key. Reference numeral 20 is a cassette tape record/playback stop-eject function key. Reference numeral 21 is a digital/analog clock. Reference numeral 22 is a CD record/player function keys. Reference numeral 23 is an access internet users frequency coding panel herein referred to as AINUF Coding Panel. Reference numeral 24 is a CD unitary record/playback function key herein referred to as CD. Reference numeral 25 is a satellite/radio/television power antenna. Reference numeral 26 is a CD player/memory record function key herein referred to as REC.CD. Reference numeral 27 is an AM/FM selector/knob. Reference numeral 28 is a surround sound voice recognition microphone herein referred to as MIKE. Reference numeral 29 is a cassette tape record/playback status LCD herein referred to as TAPE DISPLAY. Reference numeral 30 is a CD record/playback status LCD herein referred to as CD DISPLAY. Reference numeral 31 is a full function fax machine with built in thermal/photo paper print roller. Reference numeral 32 is a print delivery tray. Reference numeral 33 is an auxiliary/accessory function key herein referred to as ACC. Reference numeral 34 is the unit wireless software programming capability factory preset button herein referred to as PROGR. Reference numeral 35 is a CD record/playback override function key herein referred to as P.O/R for playing compact player disc, CD-ROM and other conventional discs. Reference numeral 36 is a LCD auto screen. Reference numeral 37 is a high frequency dubbing sensor scanner herein referred to as Fds. Reference numeral 38 is a CD record/playback track function key. Reference numeral 39 is a CD record/playback eject/auto eject wrong function select key herein referred to as CD EJECT.

Figure 13:
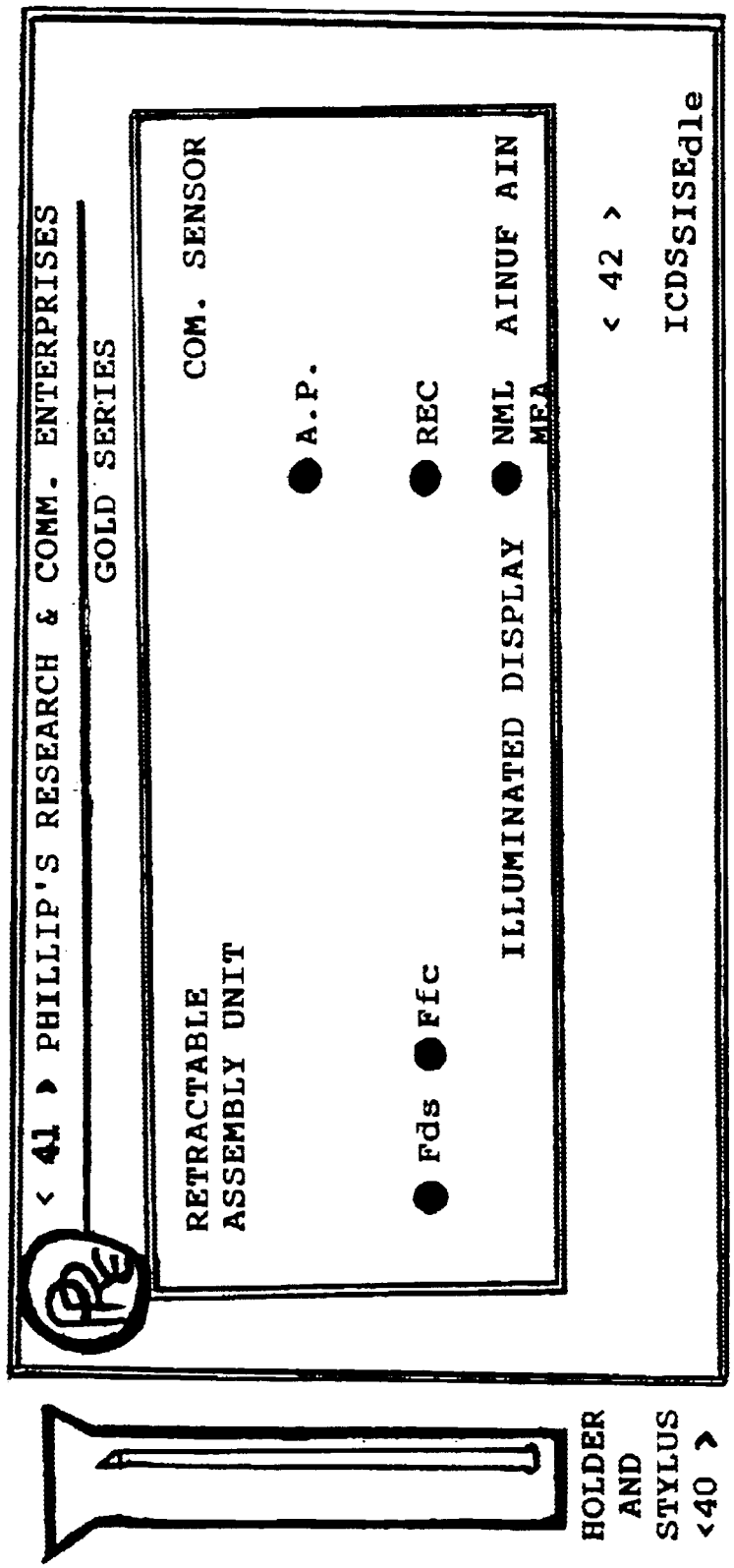
FIG. 13 is a top plan view similar to FIG. 5 showing the relation of log inscription of the present invention.

Refer now to FIG. 13 for explaining numerals 40–42 in the several views of FIG. 1 wherein reference numeral 40 is an electronic pen/stylus herein referred to as STYLUS attached to a detachable/affix stylus holder conveniently located to the left side of the unit electronic compartment frame. Reference numeral 41 is a perspective label of a manufacturers log inscription shown herein as inventors log for explaining designated location of log. Reference numeral 42 is a preferred log inscription herein referred to as PRODUCT LOGO of the device of the present invention.

Refer now to FIGS. 7 through 10 for explaining the unit internal configuration, interactive program integration and connections of the several views of FIG. 1 of the present invention. The CD recorder/player 24 is an audio/video unit. The cassette tape recorder/player 18 is an audio unit only. The CD record/player output terminal connects to the cassette tape record/player input terminal wherein the cassette tape record/player output terminal connects to the CD record/player input terminal. The cassette tape record/player and the CD record/player connect to the computer motherboard and the reverse logic dubbing -CPU through the computer logic command and the logic control chip of the dubbing CPU having connections with the COM.SENSOR 1, Ffc 3 and Fds 37 for providing commercial and interruption free record/playback of data information from satellite, radio and television stations. An output terminal of the audio amplifier connects to the input terminals of the cassette tape record/player 18 and the CD record/player 24. The audio/video amplifier serves as means of selecting a desired output speaker amplification of the tape record/player 18 and the CD record/player 24. When information is been dubbed, the reverse logic software selects a desired playback unit from the CD record/player 24 or the cassette tape record/player 18 and supplies a playback output of the selected unit to the dubbing CPU to be recorded on a tape/CD/memory space. When information is been dubbed internally as a result of a triggered embodiment i.e. new music release, live music/entertainment event, sports event, children television special, station broadcast, the reverse logic automatically selects needed audio/video unit and supplies a playback output mode of the frequency signals in the system database to the dubbing CPU to be recorded on a tape/CD/assigned memory space.

In the system according to the present invention, a simultaneous dubbing operation occurs while engaged in a current recording at 18 and 24. The unit antenna 25 on the several views of FIG. 1 constantly scan and detect new music release 5 and live music and entertainment events 6 from satellite/radio/television sources 25, 27, even when the vehicle is not in use. Upon sensing a new music release 5 and or live music and entertainment event 6, the unit computer automatically activates the reverse logic dubbing CPU to select a tape/CD record/playback not engaged in as a record unit. When the system detects an audio/video signal while engaged in CD recorder/playback 24, the reverse logic dubbing CPU selects the corresponding assigned memory space of the live music and entertainment event 6 as a record embodiment space for recording the audio/video signals without interrupting current recording in the CD record/playback 24 or a record/playback in progress in the tape record/player 18.

The new music release and live music/entertainment event function keys on the several views of FIG. 1 would blink at designated location 5 and 6 respectively when the system detects new music release or live music/entertainment event as a triggered embodiment of a record/playback mode in progress. The tape record/player 18 show a steady light at designated location 3 when recording and the CD record/player 24 show a steady light at designated location 26 when recording according to FIG. 1 of the present invention. In addition, a simultaneous dubbing occurs when the cassette tape record/player 18 and the CD record/player 24 engaged in recording playback data information, while simultaneously performing a dubbing procedure of a triggered NML-R 5 or MEA 6 indicated by a blinking light. When the user selects the CD record/player 24 as the playback unit, he or she places the CD record/ player 24 in the playback/record mode simply by inserting a prerecorded CD. When the user wants to playback a CD without dubbing procedure, he or she deactivates the CD playback record function key 26 (REC.CD). The REC.CD function key 26 is in playback state or mode when there is no indication or status light showing. When the cassette tape record/player 18 is the preferred record unit, the user selects the RECORD function key 3 wherein it shows light to indicate a record state. Thus, the reverse logic dubbing CPU automatically selects the CD record/player 24 playback output to the cassette tape record/player 18 input as a record unit when the user inserts a blank cassette. The system computer logic command instructs the dubbing CPU logic control chip to record and store the data information playback in the CD player unit 24 onto a memory space of the cassette tape record/playback 18 when the RECORD function key 3 is not in record state or mode, visa-vis the REC.CD function key 26. In the system according to the present invention, the simultaneous dubbing operation occurs between the two units when the tape record/player and CD record/player are in record states. An inserted prerecorded tape or CD places either unit in a playback state while an inserted blank tape or CD places either unit in a record state. Recording operations occur with or without a cassette tape or a CD.

As shown in FIG. 12, the tape record/player 18 and the CD record/player 24 have system controllers 3, 4, 16, 17, 19, 20, 22 and 23, 26, 35, 38, 39 respectively. The system controllers (herein referred to as function keys) connect through a bus line and data is exchanged among the function keys or controllers through a bus line as shown in FIGS. 7, 8, 9, 10, 17, 19, 21 and 26. The data frequency signal used in the tape record/player 18 and CD record/player 24 is composed of two categories of frequency signals and commands. The free lance frequency signal is composed of, for example, audio that represents the type of the data such as a cassette record/player 18, new music releases, teleconferencing and databank or database of recording studios, billboards, label company and recording artists Another data frequency signal is composed of, for example, audio/video that represents the type of the data such as a CD record/player 24, new music releases, live music/entertainment, internet access, internet access users frequency, telephone/video conferencing, fax, e-mail and databank or database of recording studios, bill boards, label company and recording artists/actors which are processed and amplified digitally through a bus line to the vehicle speaker system.

Figure 14:
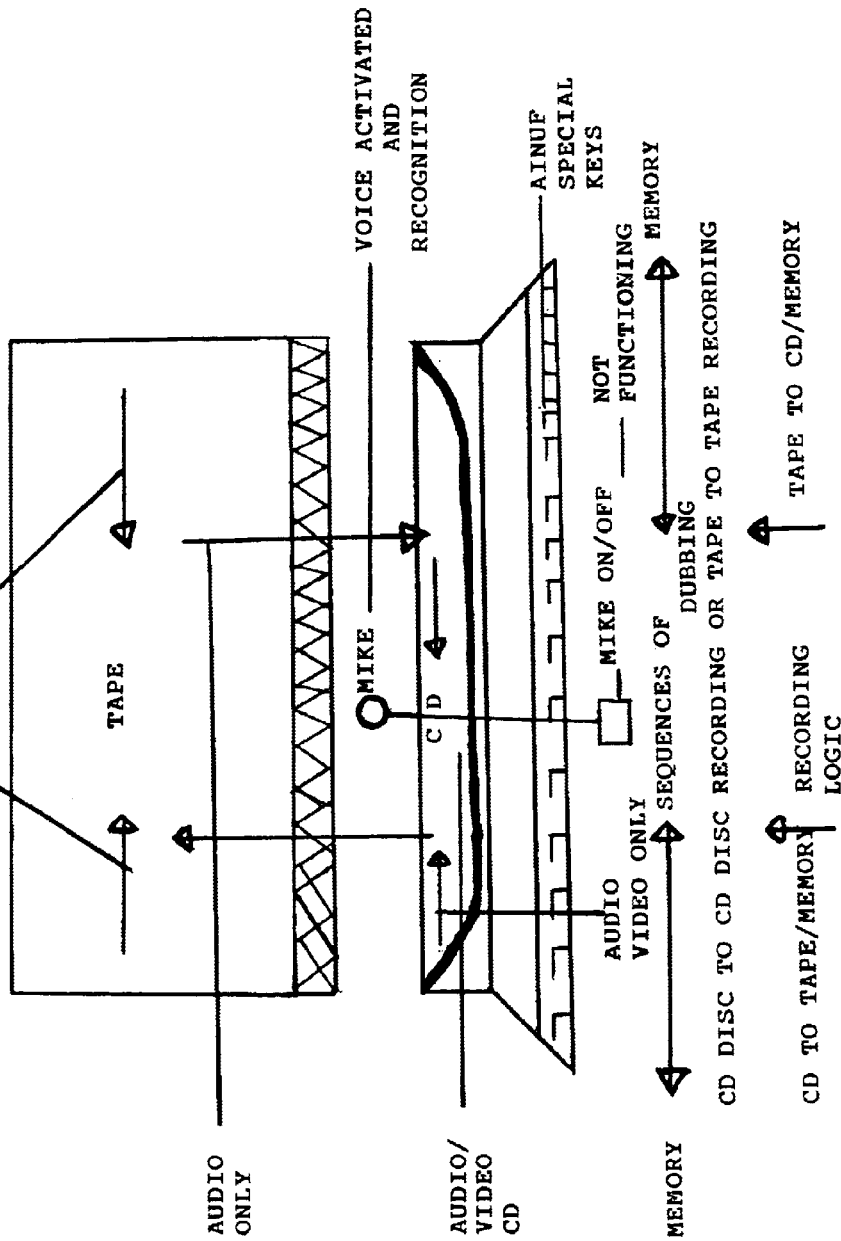
FIG. 14 is a transition diagram showing sequences in dubbing, the relation of audio/video and tape/cd dubbing logic according to the present invention.

As shown in FIG. 12, the audio frequency has an AM/FM source 25 and satellite source 27. The audio/video frequency has NML-R source 5, MEA source 6, AINUF source 7, AIN source 8, SL-W source 12 and CAM.EYE source 13. The playback output of the cassette tape record/player 18 supplies to an input terminal of the sources 5, 6 and 8. A playback output of the CD record/player 24 supplies to an input terminal of the sources 5, 6, 7, 8, 12 and 13. An output of the sources 25 and 27 are supplied to input terminal of the CD record/player 24 and the output sources 5 and 6 are supplied to the input terminal of the tape record/player 18 while recording output terminals of the tape record/player 18 are conversely supplied to the input terminals of the CD record/player 24 vice-versa. The cassette tape record/player 18 and the CD record/player 24 configured onto the computer motherboard and the reverse logic dubbing CPU. FIG. 14 shows the recording states and the dubbing sequences of the tape and CD players. In the system according to the present invention, recording from a station onto tape or CD, tape to tape, CD to CD, CD to tape, tape to CD and tape or CD to memory are dubbing operation procedures corresponding to the unitary reverse logic dubbing CPU of the tape/CD record/player and the preferred embodiments.

Figure 11:
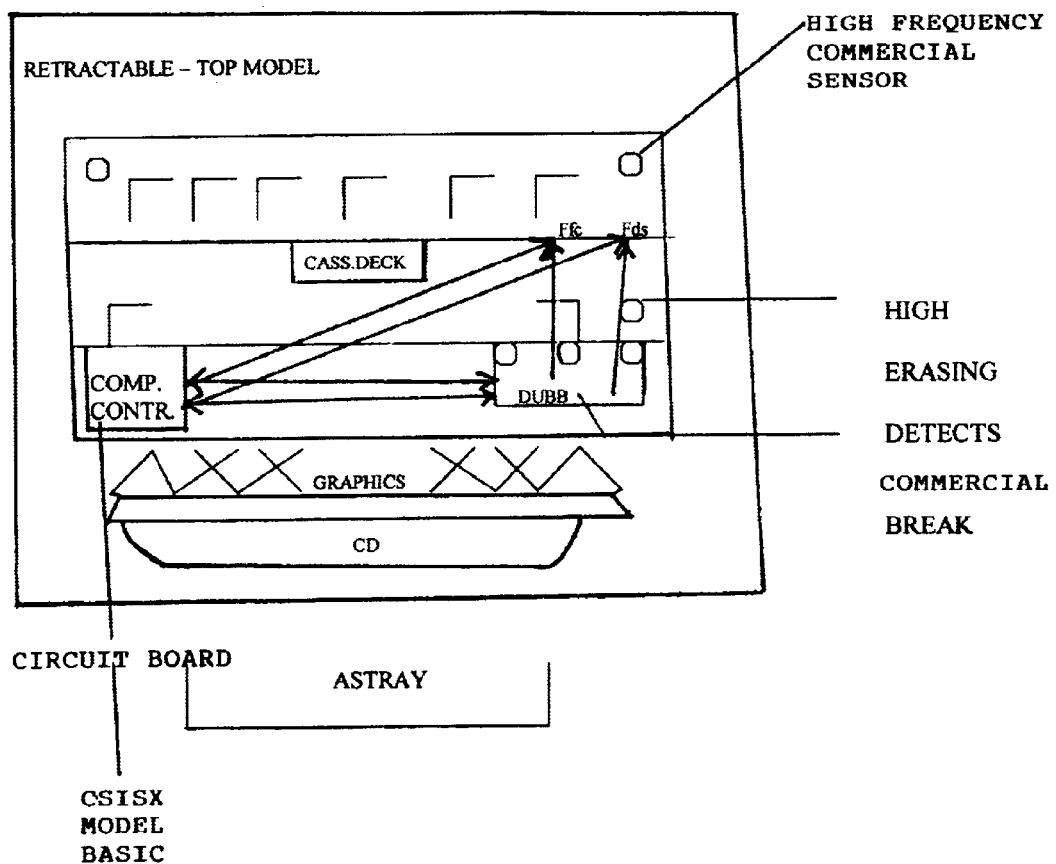
FIG. 11 is a schematic view showing the relation of models/choices of the integrated car dubbing system according to the present invention.
Figure 15:
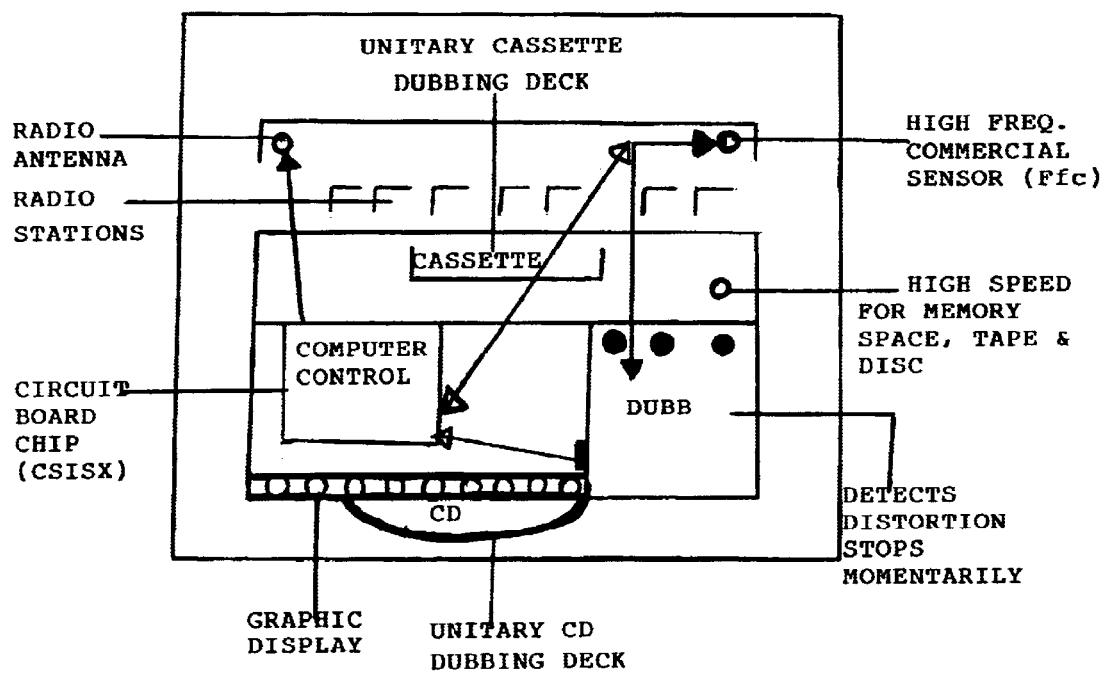
FIG. 15 is a transition diagram showing the relation of computer command control and commercial/station break free dubbing according to the present invention.
Figure 16:
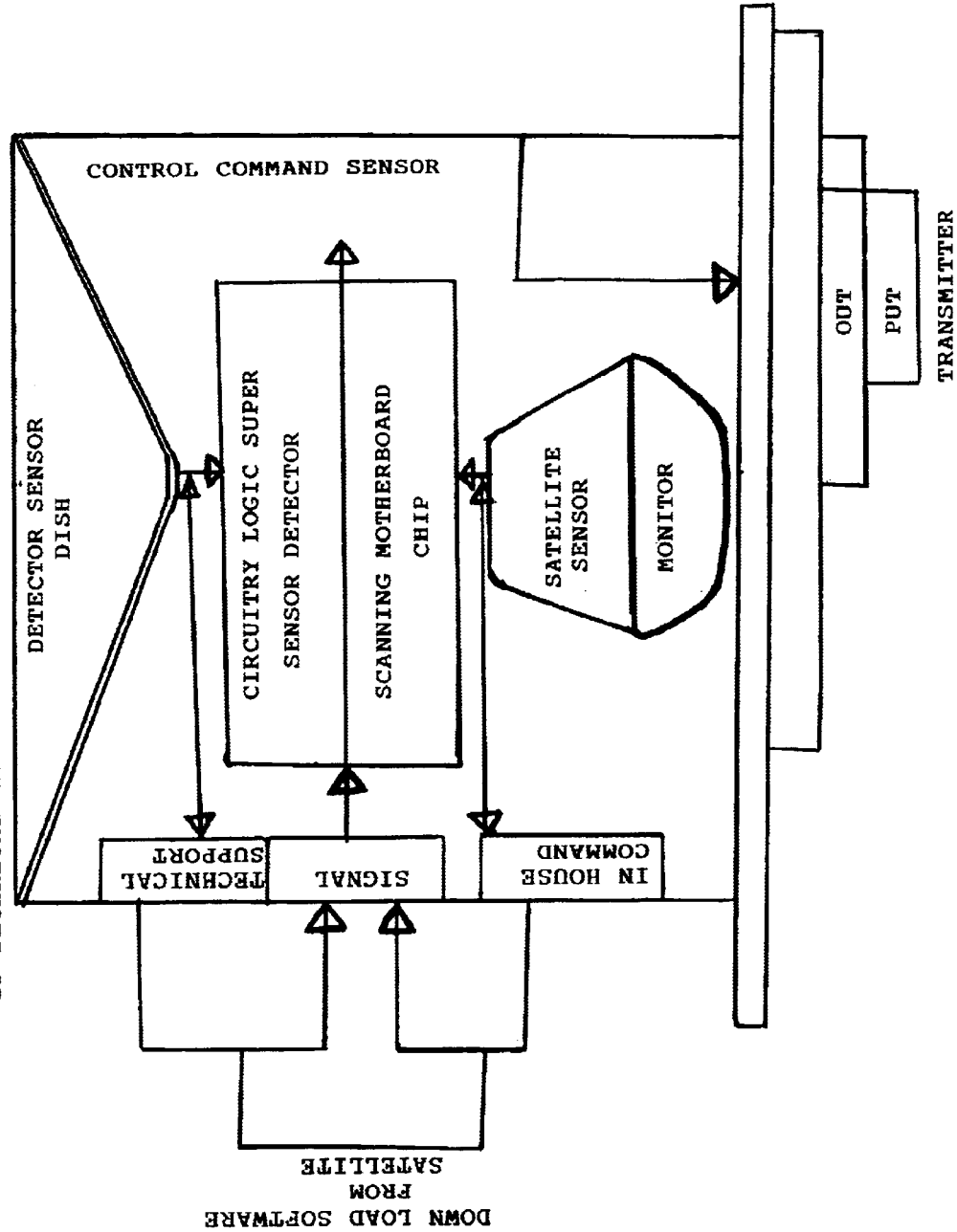
FIG. 16 is a schematic block diagram showing the relation of computer motherboard and satellite/wireless programming according to the present invention.
Figure 17:
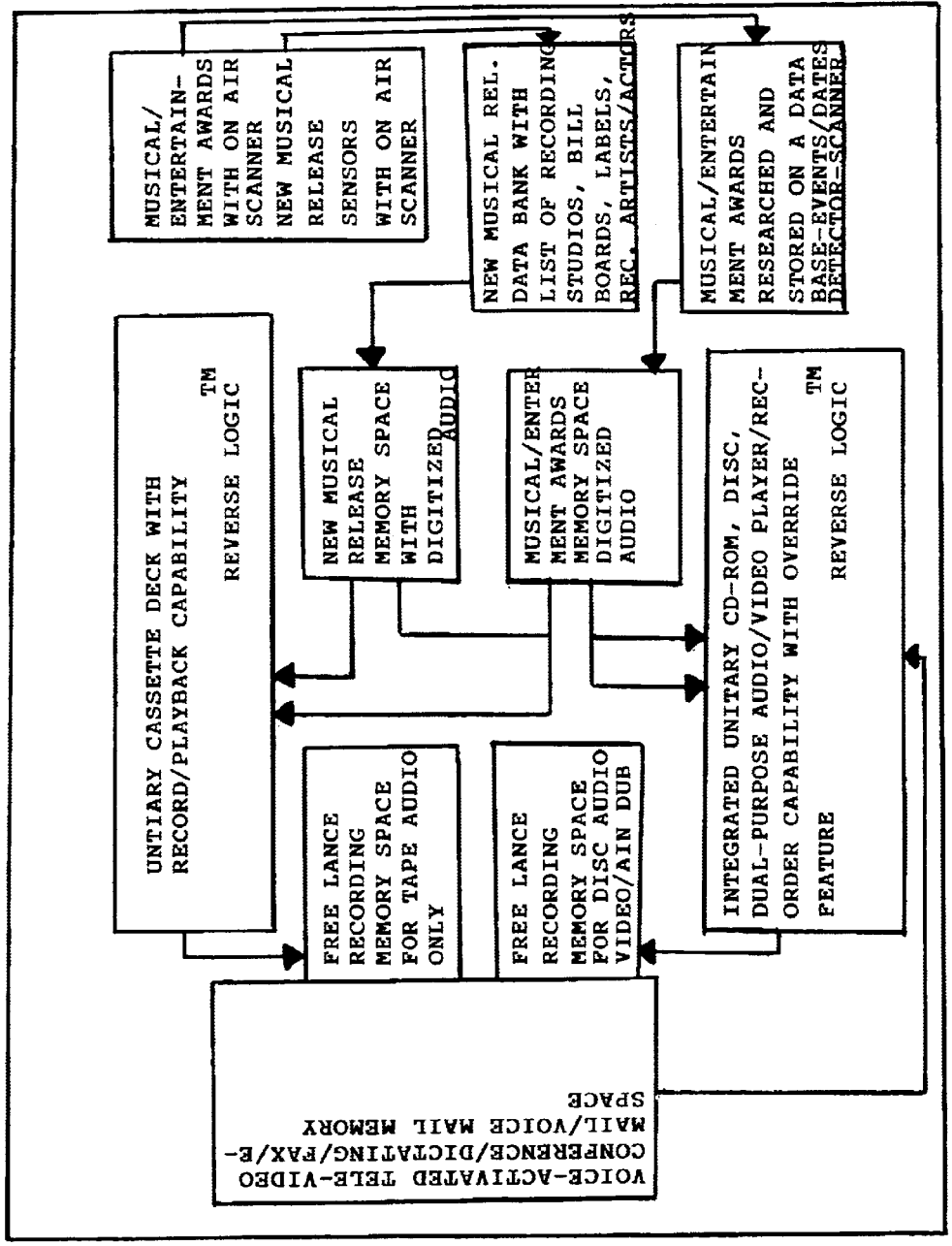
FIG. 17 is a schematic block diagram showing the relation of memory spaces, signal logic flow and internal connection and configuration of the present invention.
Figure 18:
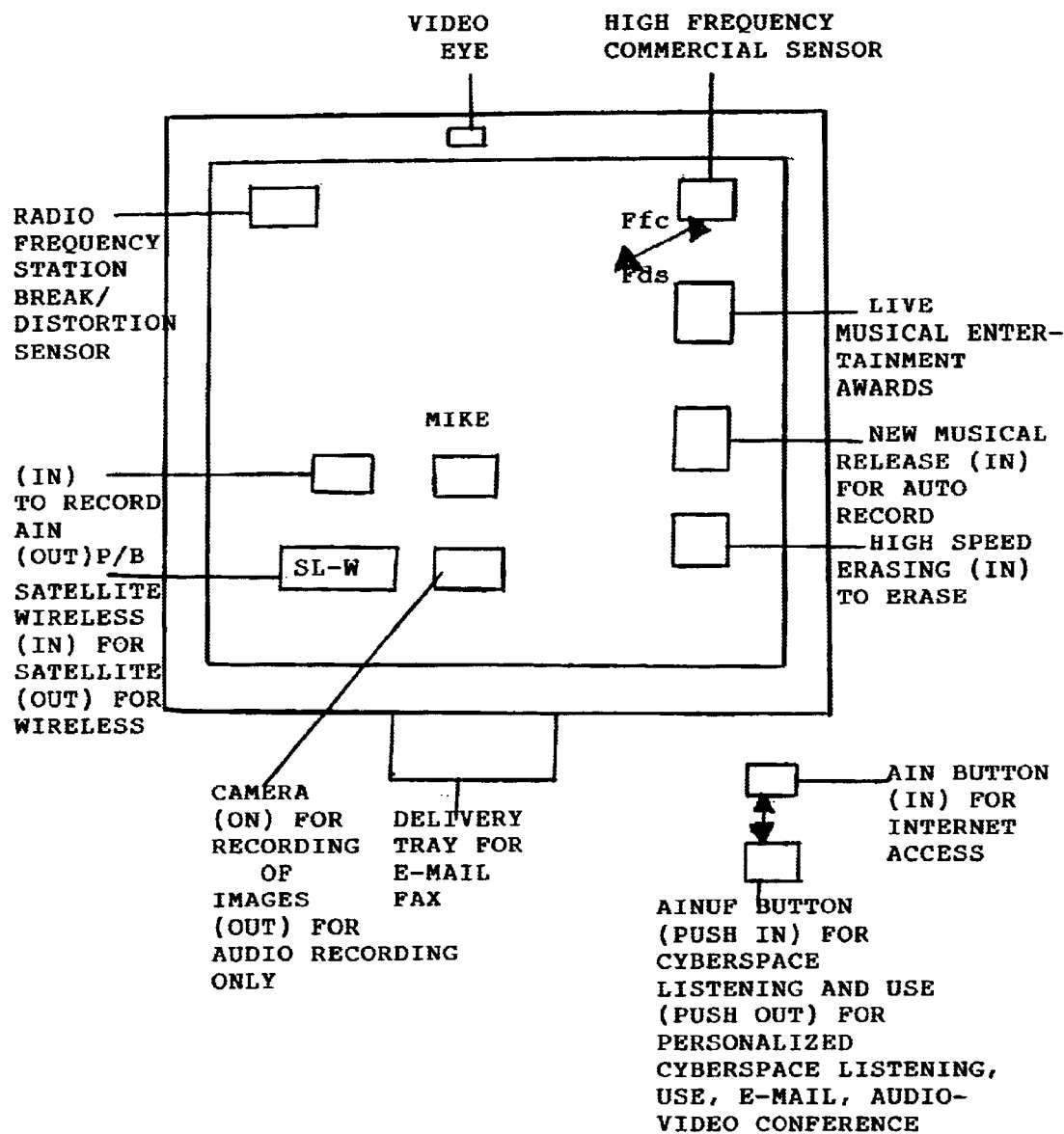
FIG. 18 is a block diagram showing frequency signals of the unit embodiments according to the present invention.
Figure 19:
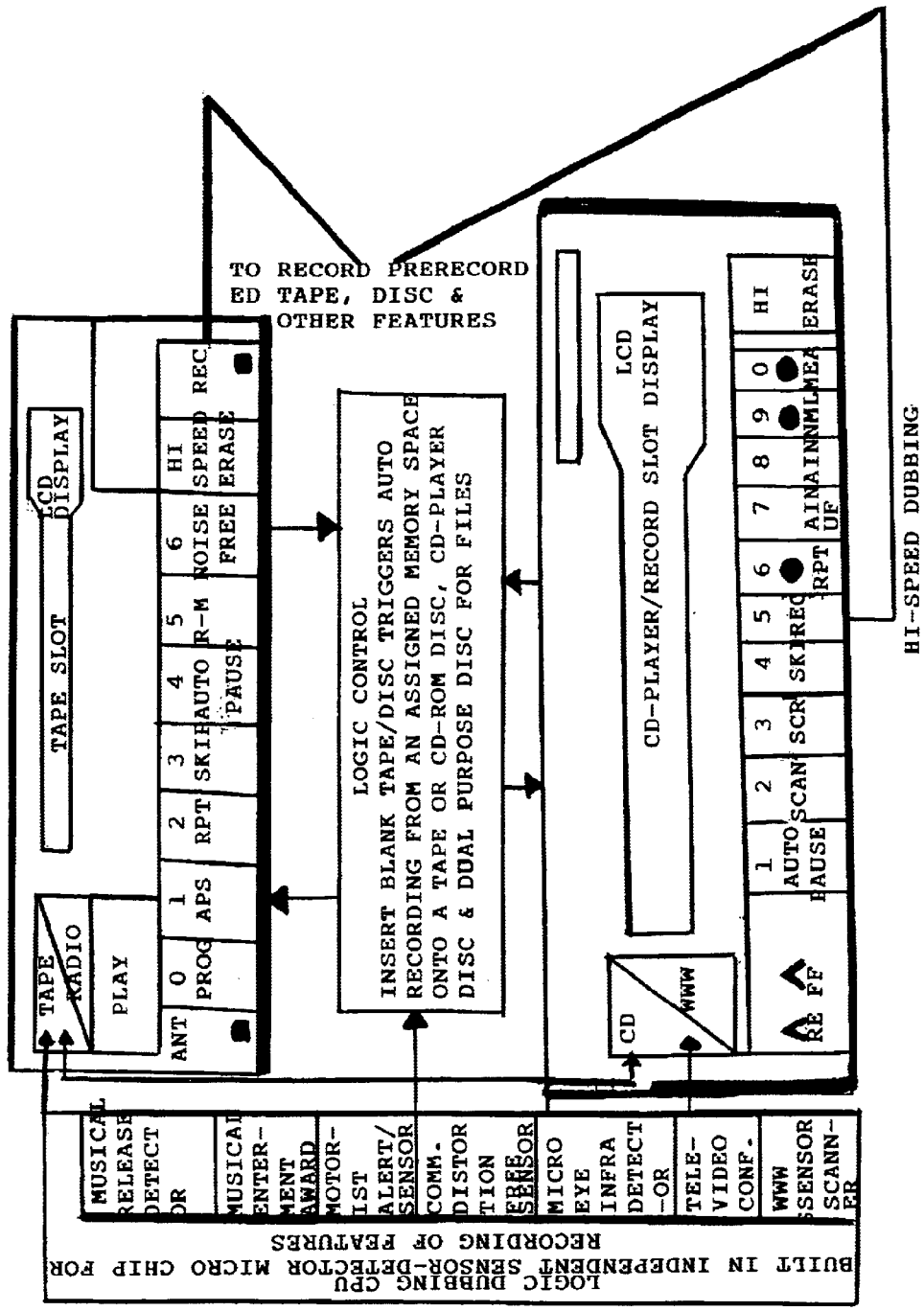
FIG. 19 is a perspective block plan view showing the relation of tape/cd reverse logic control, embodiments and corresponding keys according to the present invention.
Figure 20:
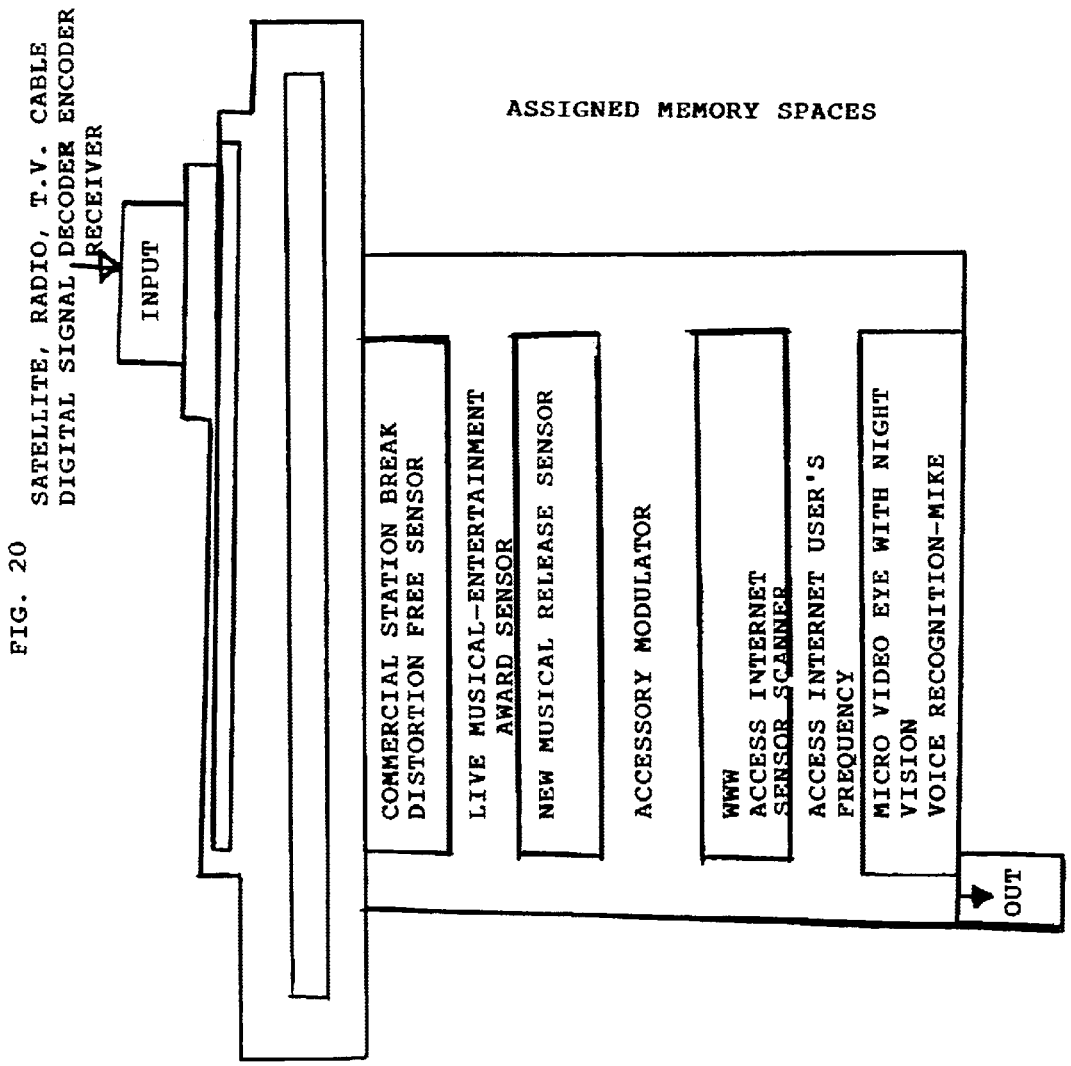
FIG. 20 is a block diagram showing satellite, radio, television signal input and output to the unit memory assigned embodiments according to the present invention.
Figure 21:
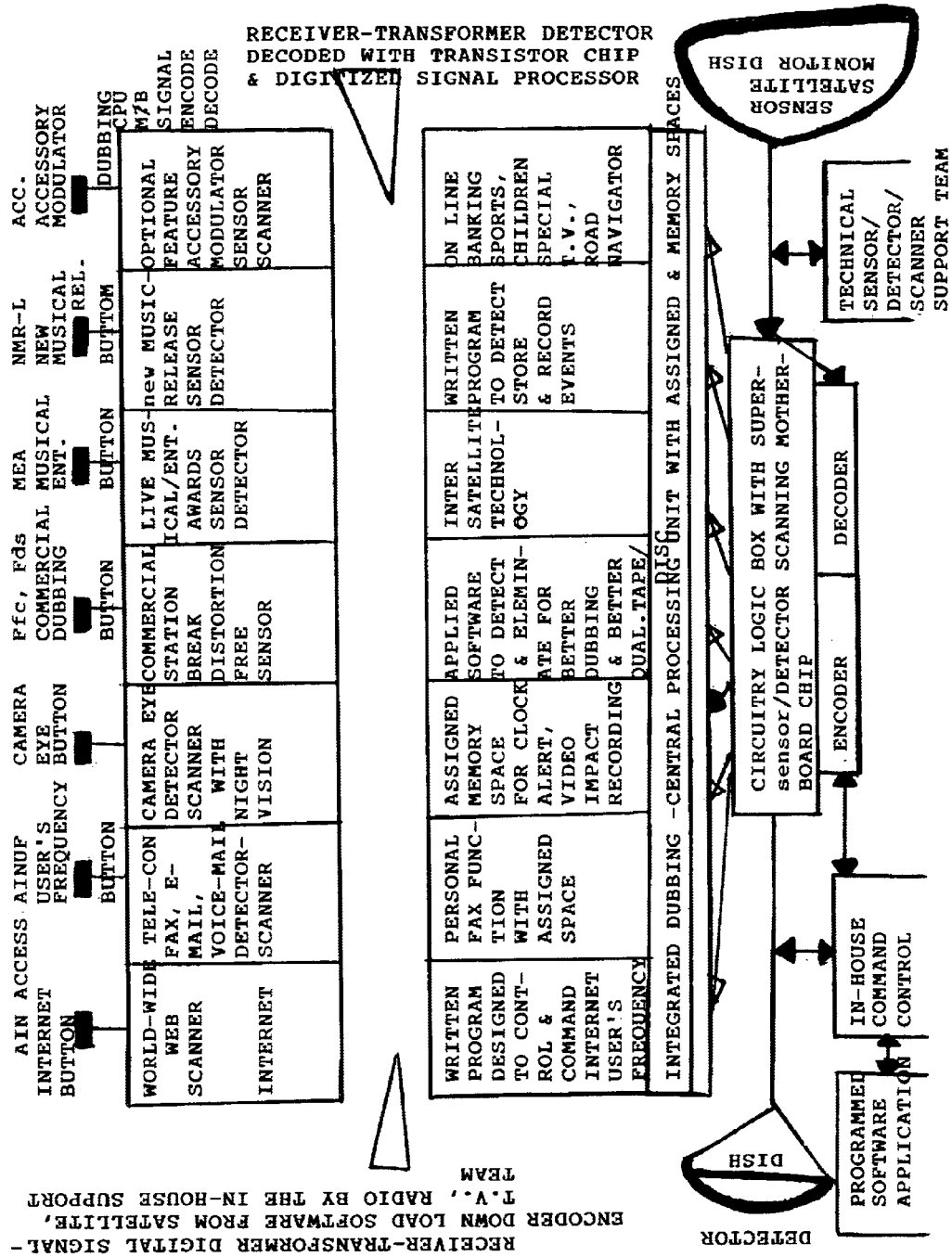
FIG. 21 is a schematic block diagram showing satellite dish signal reception, the relation of computer motherboard and memory space for free lance recording and assigned memory space for recording the unit embodiments.
Figures 23, 24:
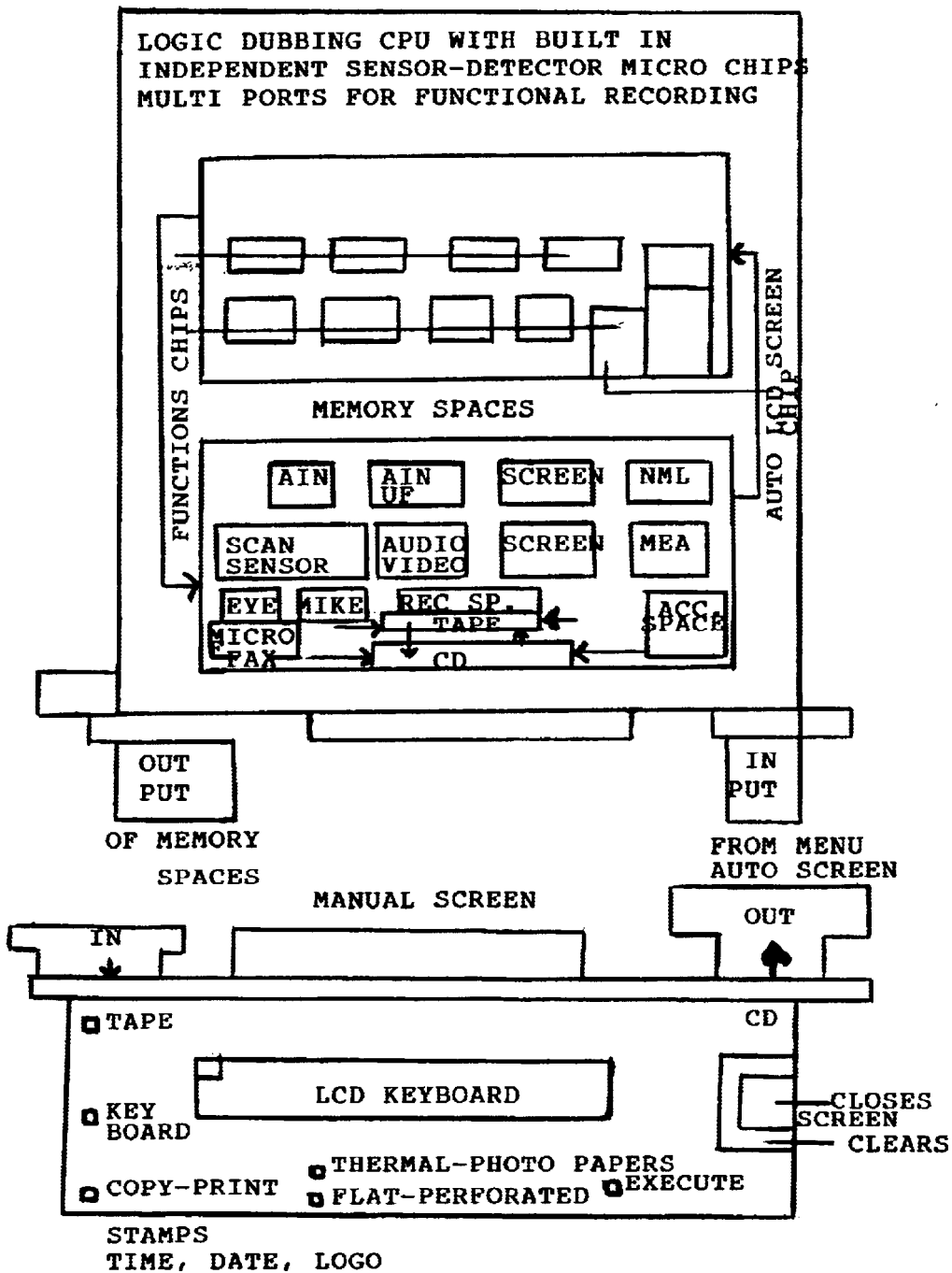
FIG. 23 is a schematic block diagram showing perspective view of memory chips and the relation of auto/manual screen configuration.
FIG. 24 is a block diagram showing manual lcd screen input/output display according to the present invention.

FIG. 11 is a diagram showing the system computer motherboard (herein referred to as CSISX) with COM.SENSOR 1, high frequency commercial sensor Ffc 2, high frequency dubbing sensor/scanner Fds 37 and the retractable assembly for explaining how the present invention provides four choices of the device models. FIG. 15 is a diagram showing the relation of connections of the computer motherboard to the dubbing CPU through the Ffc 2 and the Fds 37 for explaining how the tape record/player 18 and CD record/player 24 record data information and frequency signals without commercial and or distortion. FIGS. 16, 20 and 21 are diagrams showing the system downloaded software and programming from satellite/wireless sources for backup purposes. Specifically, FIG. 20 shows satellite, radio and television input sources and memory storage for the preferred embodiments processed as output signals for the unit operation procedure such as internet and fax configuration, output to the auto screen 36 and input to the manual screen as shown in FIG. 24. FIG. 23 is a diagram showing input from the manual screen and output from the memory spaces for explaining audio and audio/video recording of the cassette tape record/player 18 and the CD record/player 24 wherein the auto screen 36 and manual screen provide a visual means by which the user can perform operation such as tape, CD, fax, keyboarding, print, execute, clear, end (close) operation and telephone/video conferencing with similar device at a distance location. The manual screen shows certain functions in words and icons and can be access by means of the STYLUS 40. The auto screen 36 provides for a pull down menu wherein the functions are display in words and icons with a LCD computer keyboard. The user activates the auto screen 36 prior to using the AINUF 7, AIN 8 and telephone/video conferencing by activating the MIKE on/off switch 14 and the CAM on/off switch 15 as shown on FIG. 1 of the present invention.

Figure 22:
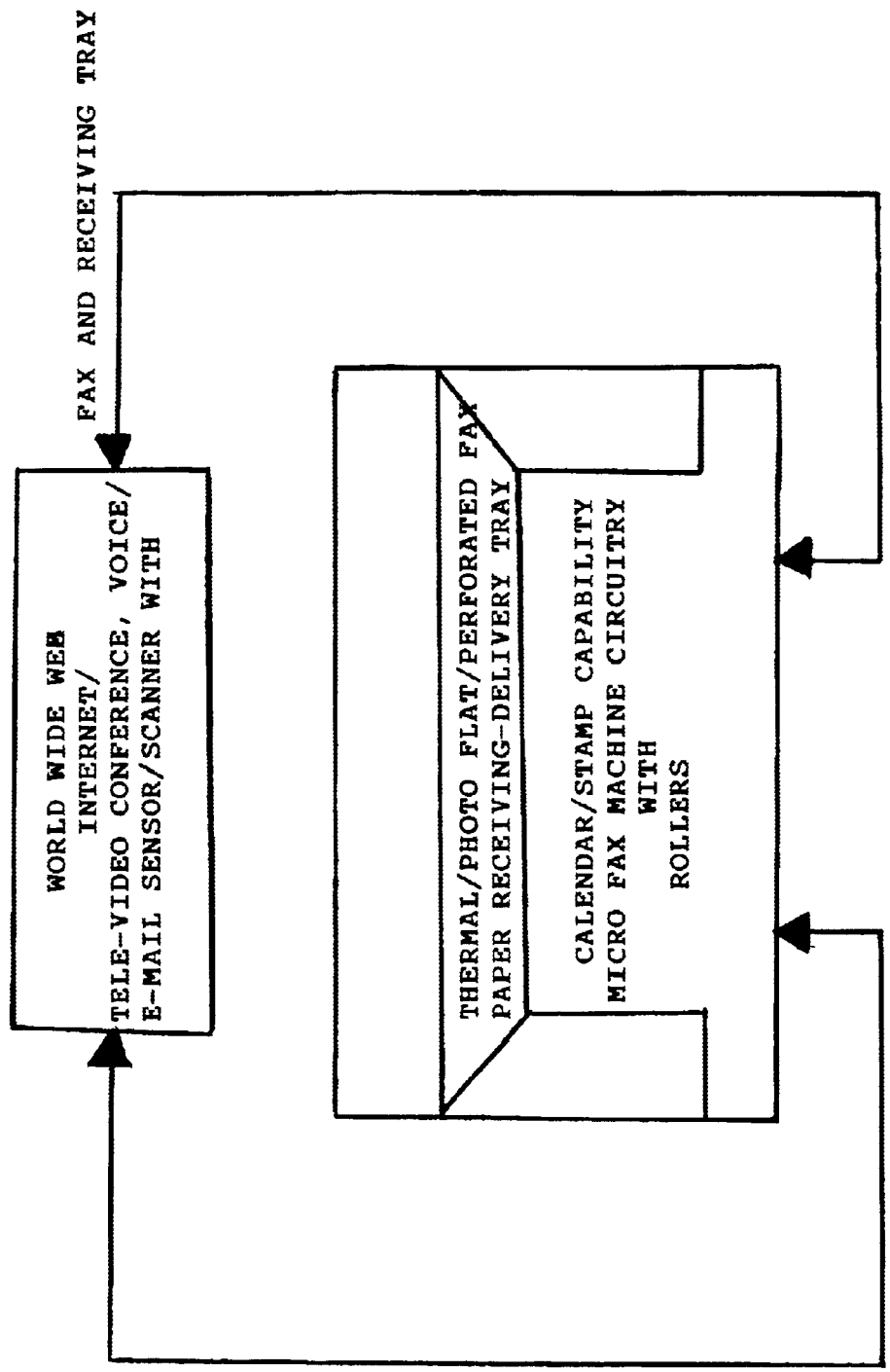
FIG. 22 is a block diagram showing the relation of fax and internet access supports according to the present invention.

FIG. 22 shows how the AIN 7 integrates with the WWW 9 and the FAX 10, wherein the fax has a built in flat/perforated thermal/photo paper with print rollers and delivery tray for receiving printed and stamped fax and or e-mail copy.

Figure 25:
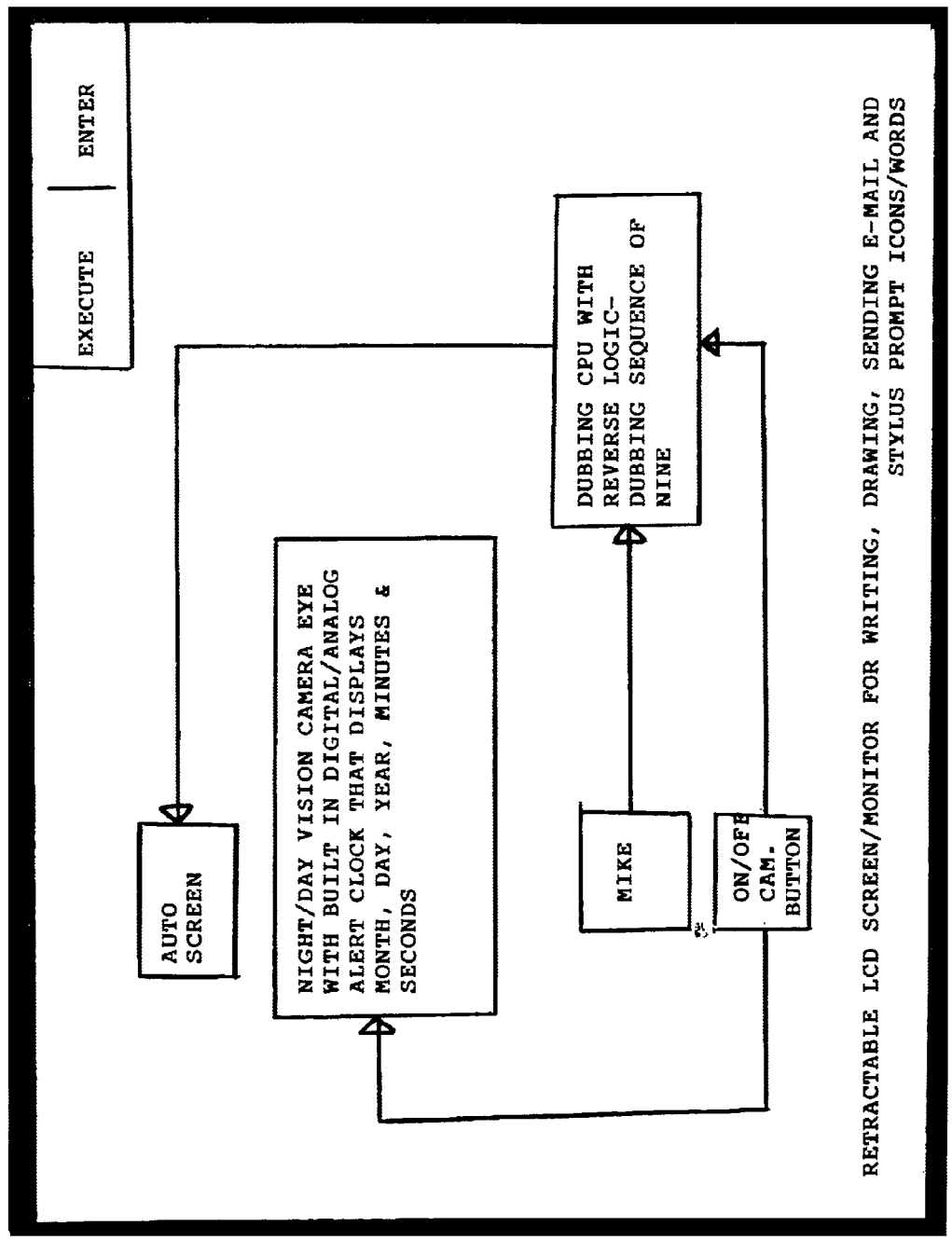
FIG. 25 is a block diagram showing the relation of internet access support and display connections to the dubbing cpu according to the present invention.

FIG. 25 shows the relation of connections between the internet access keys and the keyboard and how the desired functions are display on the auto screen 36 when the user activates MIKE 14 and CAM 15.

Figure 26:
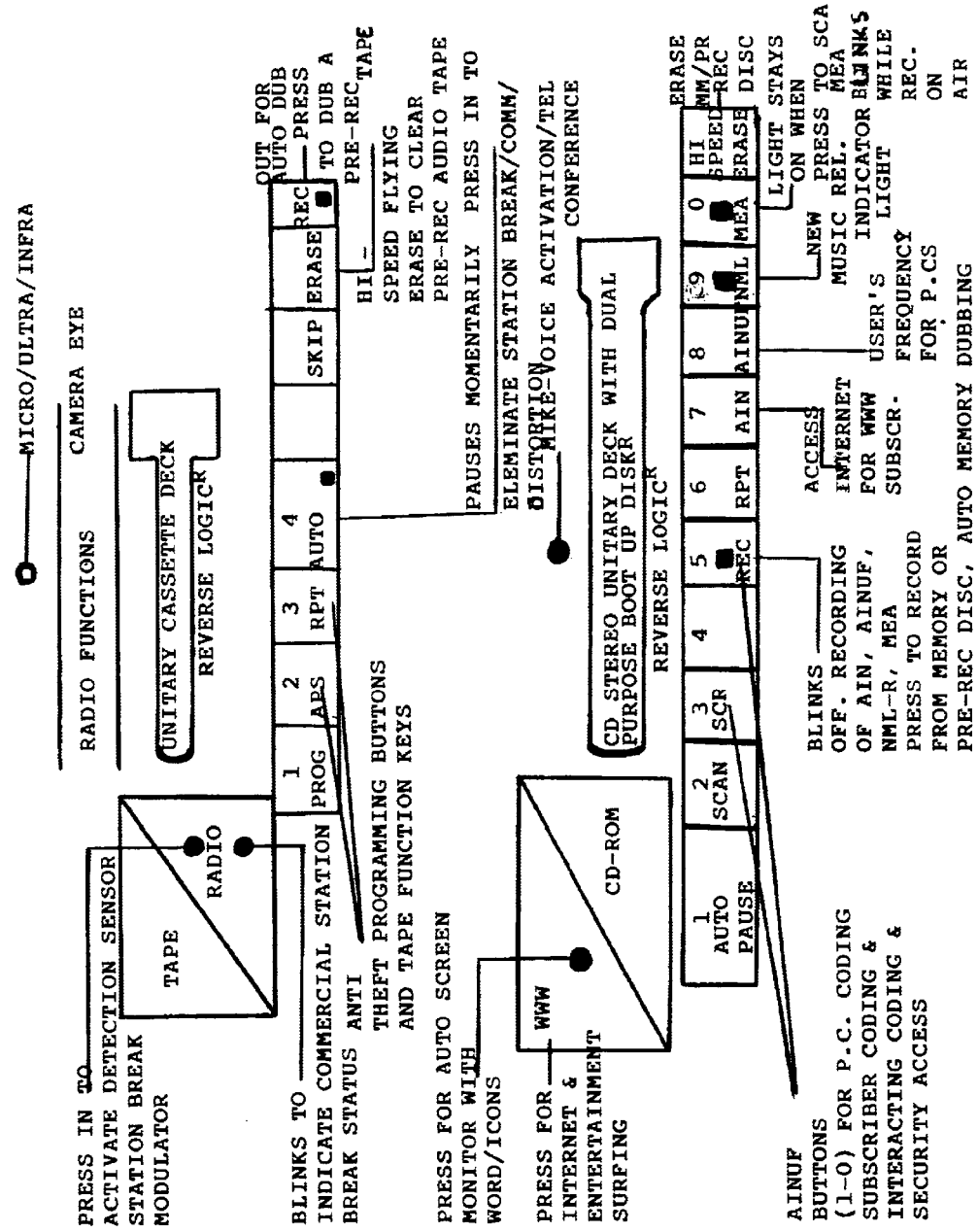
FIG. 26 is a schematic diagram showing the device practicality and use of the present invention.

FIG. 26 shows how the user performs operation(s) and what embodied key(s) to use to perform the desired operation(s) according to the present invention.

Figure 27:
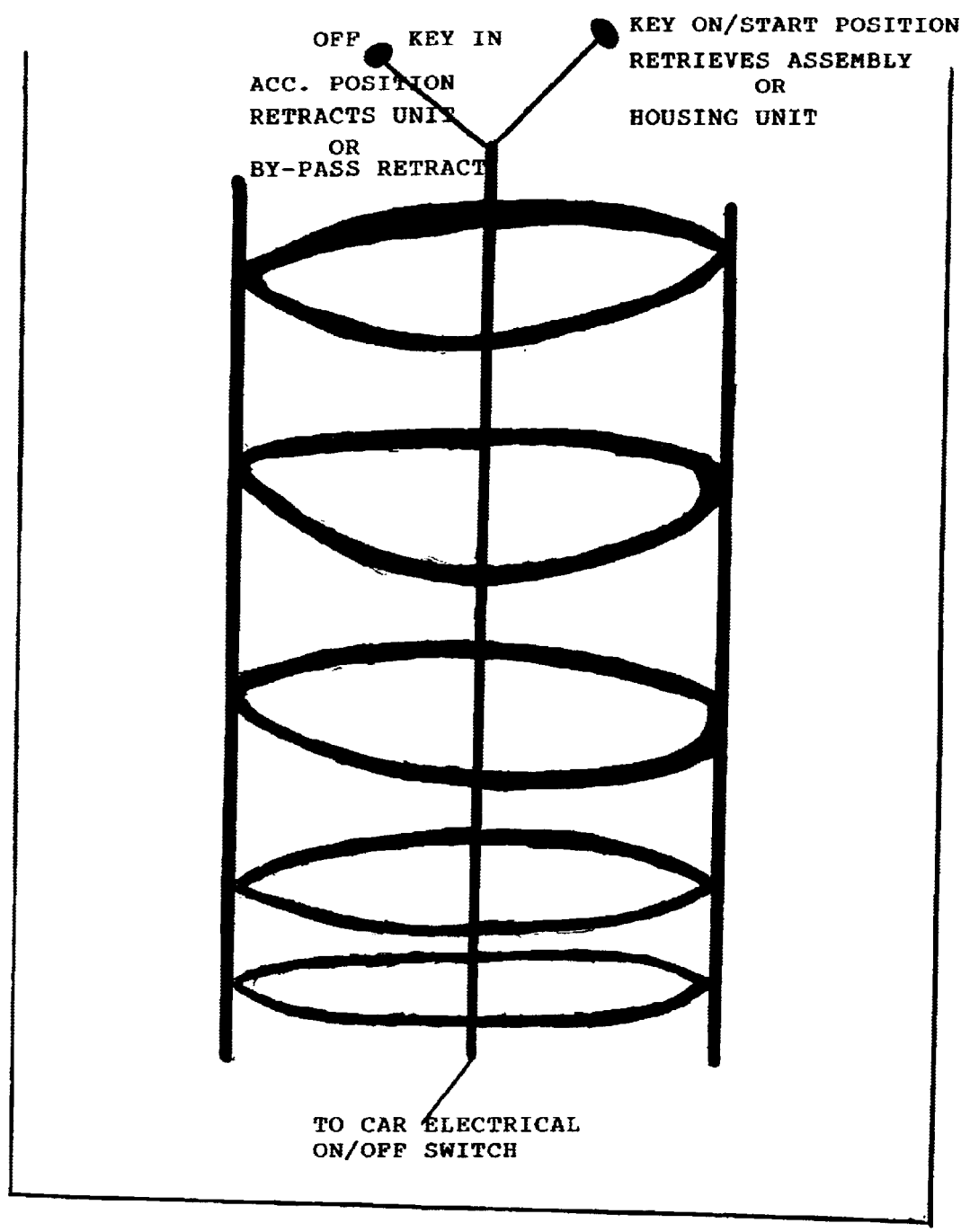
FIG. 27 is an inside elevational view of the unit retractable assembly connection to vehicular ignition switch.

FIG. 27 shows the relation of the vehicle electrical connection to the retractable assembly with electronic spring sensor that carries the unit inward and outward. When the vehicle operator engages the ignition switch to start the vehicle, the system automatically retrieves the assembly unit into the electronic compartment (seen). When the vehicle ignition switch is in off position, the system retracts the assembly unit inward (not seen) herein accessory switch position by passes the retractable mode wherein the vehicle operator and passengers can now visually interact with the unit.

Figure 28:
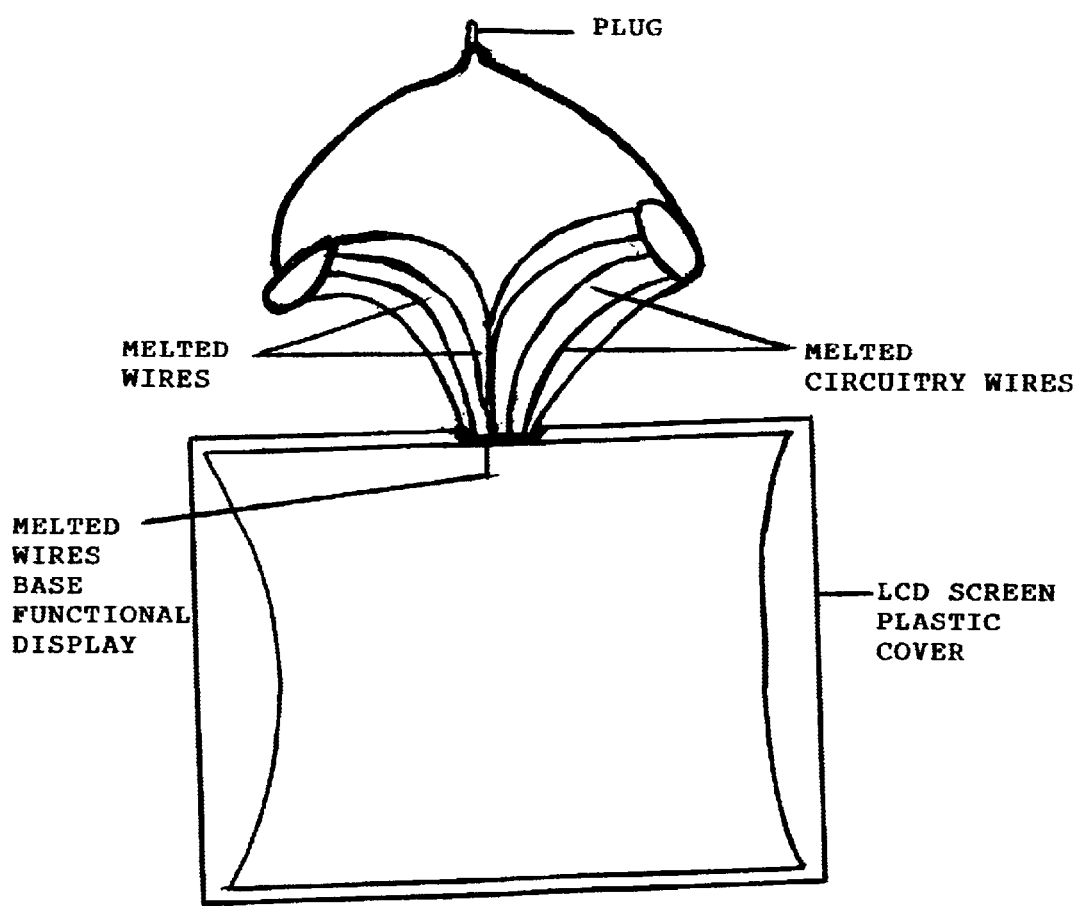
FIG. 28 is a plan view showing wire circuitry and the relation of melted wire connections to the unit lcd manual cover screen.

FIG. 28 shows wire circuitry and the melted wires connection to the flat or concavely shaped manual screen cover. The manual screen provides against dust or inadvertent damage and for visual interaction during telephone/video conferencing with friends and family having similar device.

Although the present invention has been shown and described with respect to the best preferred mode of operation and embodiment thereof, it should be understood by those in the art that the foregoing and various other changes, omissions, and additions in the form and detail thereof may have be made therein without departing from the spirit and scope of the present invention.

Having identified the presently preferred best mode thereof, I claim:

1. An integrated car dubbing unit comprising:
   a LCD screen,
   a computer motherboard with optional ports,
   a reverse logic dubbing CPU,
   a record/playback memory space,
   a record/playback tape deck,
   a record/playback CD-player,
   high speed dubbing and high speed memory erase capabilities,
   an audio/video surround sound microphone and infra red night vision camera,
   a full function fax and print delivery tray,
   an accessory and/or auxiliary port,
   a digital/analog clock,
   a dual purpose audio/video track disk having software downloaded onto the motherboard that is used to reboot the CD player or re-configure the unit if there was a unit failure,
   wherein the unit detects satellite, AM/FM radio stations and television broadcasts including new music release/live music-entertainment event and upon detection of a commercial break, station break, distortion or satellite interruption, the unit pauses a recording function until the commercial or station break, distortion or satellite interruptions are eliminated,
   wherein the unit downloads software/programming from satellite/wireless sources for backup purposes,
   wherein the microphone and camera provide telephone/video conferencing and capture impacts and unwarranted intruder for later review by authorities or aid in reducing insurance cost and an audible sound alerts a motorist when the camera senses fatigue in the motorist, and
   wherein the unit supports Internet access, on-line banking, stock market trading, commodity, and precious stone/metal trading.

2. The integrated car dubbing unit of claim 1, further comprising recording from a station onto tape or CD, tape to tape, CD to CD, CD to tape, tape to CD and tape or CD to memory.

3. The integrated car dubbing unit of claim 1, wherein the unit is impact resistant and further comprises a retractable assembly.

* * * * *